US012212791B2

United States Patent
Dalrymple et al.

(10) Patent No.: US 12,212,791 B2
(45) Date of Patent: Jan. 28, 2025

(54) METADATA DELIVERY SYSTEM FOR RENDERING SUPPLEMENTARY CONTENT

(71) Applicant: Comcast Cable Communications, LLC, Philadelphia, PA (US)

(72) Inventors: Michael Dalrymple, San Francisco, CA (US); Zane Vella, San Francisco, CA (US); Ken Goudey, San Francisco, CA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 0 days.

(21) Appl. No.: 15/331,811

(22) Filed: Oct. 22, 2016

(65) Prior Publication Data

US 2017/0041644 A1    Feb. 9, 2017

Related U.S. Application Data

(63) Continuation-in-part of application No. 13/738,551, filed on Jan. 10, 2013, now abandoned, and a
(Continued)

(51) Int. Cl.
*G06F 3/00* (2006.01)
*H04N 21/235* (2011.01)
(Continued)

(52) U.S. Cl.
CPC ....... *H04N 21/235* (2013.01); *H04N 21/4316* (2013.01); *H04N 21/435* (2013.01);
(Continued)

(58) Field of Classification Search
CPC ......... G06F 3/01; G06F 3/0484; H04N 5/445; H04N 21/4316; H04N 21/84;
(Continued)

(56) References Cited

U.S. PATENT DOCUMENTS

| | | | |
|---|---|---|---|
| 6,018,768 A | 1/2000 | Ullman et al. | |
| 6,188,398 B1 * | 2/2001 | Collins-Rector | G06Q 30/02 348/E5.104 |

(Continued)

FOREIGN PATENT DOCUMENTS

| | | |
|---|---|---|
| CA | 2973717 A1 | 1/2018 |
| EP | 3270600 A1 | 1/2018 |

(Continued)

OTHER PUBLICATIONS

US Patent Application filed on Jan. 10, 2012, entitled "Interface for Displaying Supplemental Dynamic Timeline Content", U.S. Appl. No. 61/631,814.

(Continued)

*Primary Examiner* — Thanh T Vu
(74) *Attorney, Agent, or Firm* — BakerHostetler

(57) ABSTRACT

A computer system (e.g., such as provided for a network service) operates to determine an inventory of time slots for a given airing. The computer system assigns a supplemental content item to a time slot of the given airing when the given airing is rendered on at least some of a plurality of playback devices. The computer system may structure a tag element to include data that is specific to a third-party, and then communicate a plurality of tags that include the tag elements to playback devices that are (or will) render the primary content of the airing.

34 Claims, 7 Drawing Sheets

Related U.S. Application Data continuation-in-part of application No. 13/523,829, filed on Jun. 14, 2012, now Pat. No. 9,762,967.

(60) Provisional application No. 62/366,540, filed on Jul. 25, 2016, provisional application No. 62/362,587, filed on Jul. 14, 2016, provisional application No. 61/631,814, filed on Jan. 10, 2012, provisional application No. 61/497,023, filed on Jun. 14, 2011.

(51) Int. Cl.
  *H04N 21/431* (2011.01)
  *H04N 21/435* (2011.01)
  *H04N 21/84* (2011.01)
  *H04N 21/258* (2011.01)
  *H04N 21/81* (2011.01)

(52) U.S. Cl.
  CPC ....... *H04N 21/84* (2013.01); *H04N 21/25891* (2013.01); *H04N 21/812* (2013.01); *H04N 21/8133* (2013.01)

(58) Field of Classification Search
  CPC ............. H04N 21/812; H04N 21/8133; H04N 21/235; H04N 21/435; H04N 21/25891
  See application file for complete search history.

(56) References Cited

U.S. PATENT DOCUMENTS

| | | | |
|---|---|---|---|
| 6,317,784 B1* | 11/2001 | Mackintosh | H04H 20/02 348/E7.063 |
| 6,357,042 B2* | 3/2002 | Srinivasan | G11B 27/031 375/E7.008 |
| 6,411,949 B1 | 6/2002 | Schaffer | |
| 6,415,326 B1 | 7/2002 | Gupta et al. | |
| 6,741,977 B1* | 5/2004 | Nagaya | H04N 5/765 |
| 6,874,126 B1* | 3/2005 | Lapidous | G06F 3/0481 715/711 |
| 7,096,271 B1* | 8/2006 | Omoigui | H04L 29/06027 709/217 |
| 7,136,871 B2 | 11/2006 | Ozer et al. | |
| 7,302,490 B1 | 11/2007 | Gupta et al. | |
| 7,379,661 B2 | 5/2008 | Lamkin et al. | |
| 7,415,529 B2 | 8/2008 | Saunders et al. | |
| 7,421,729 B2 | 9/2008 | Zenoni | |
| 7,428,696 B2* | 9/2008 | Shin | H04L 29/06027 701/468 |
| 7,472,198 B2* | 12/2008 | Gupta | H04N 21/2335 386/241 |
| 7,757,254 B2 | 7/2010 | Shoff et al. | |
| 7,788,262 B1 | 8/2010 | Shirwadkar | |
| 7,913,157 B1 | 3/2011 | Stoakley et al. | |
| 8,042,132 B2 | 10/2011 | Carney et al. | |
| 8,220,018 B2 | 7/2012 | De et al. | |
| 8,230,343 B2* | 7/2012 | Logan | H04H 20/28 715/723 |
| 8,359,399 B2 | 1/2013 | Landow et al. | |
| 8,381,259 B1 | 2/2013 | Khosla | |
| 8,385,633 B2 | 2/2013 | Gokturk et al. | |
| 8,413,205 B2* | 4/2013 | Carney | H04N 5/44543 725/135 |
| 8,448,208 B2 | 5/2013 | Moreau et al. | |
| 8,549,575 B2* | 10/2013 | Amento | H04N 7/17318 725/116 |
| 8,595,781 B2 | 11/2013 | Neumeier et al. | |
| 8,635,649 B2* | 1/2014 | Ward, III | H04N 5/44543 725/32 |
| 8,681,822 B2 | 3/2014 | Bradley et al. | |
| 8,699,862 B1* | 4/2014 | Sharifi | G06F 17/30787 386/338 |
| 8,701,005 B2 | 4/2014 | Bedingfield | |
| 8,719,869 B2* | 5/2014 | Kudelski | H04N 21/4622 725/51 |
| 8,737,813 B2 | 5/2014 | Berkowitz et al. | |
| 8,763,060 B2* | 6/2014 | Jerremy | H04N 21/438 725/110 |
| 8,775,945 B2 | 7/2014 | Jones et al. | |
| 8,776,108 B2* | 7/2014 | Barsook | G06Q 30/02 725/32 |
| 8,782,691 B1 | 7/2014 | Noble et al. | |
| 8,793,256 B2 | 7/2014 | McIntire et al. | |
| 8,850,495 B2* | 9/2014 | Pan | G06Q 30/02 725/135 |
| 8,898,698 B2* | 11/2014 | Fleischman | H04N 21/2407 725/34 |
| 8,943,533 B2 | 1/2015 | De et al. | |
| 9,154,852 B2* | 10/2015 | Huber | G06Q 30/02 |
| 9,191,722 B2* | 11/2015 | Alexander | H04N 5/44543 |
| 9,294,727 B2* | 3/2016 | Steelberg | G06Q 30/02 |
| 9,432,721 B2* | 8/2016 | Fleischman | H04N 21/2407 |
| 9,554,093 B2 | 1/2017 | Hua et al. | |
| 9,594,957 B2 | 3/2017 | Tanaka et al. | |
| 9,674,562 B1* | 6/2017 | Spracklen | H04N 21/4622 |
| 9,762,967 B2 | 9/2017 | Clarke | |
| 9,814,977 B2 | 11/2017 | Stafford et al. | |
| 9,832,532 B1 | 11/2017 | Agabob et al. | |
| 9,911,126 B2 | 3/2018 | Morten et al. | |
| 9,922,334 B1 | 3/2018 | Rothman | |
| 10,061,742 B2 | 8/2018 | Lang et al. | |
| 10,528,631 B1 | 1/2020 | Nordhagen | |
| 10,579,215 B2* | 3/2020 | Leatham | H04N 21/4122 |
| 10,664,138 B2* | 5/2020 | Carney | H04N 21/235 |
| 10,708,336 B2* | 7/2020 | Bowen | H04L 67/02 |
| 2001/0001160 A1 | 5/2001 | Shoff et al. | |
| 2002/0042920 A1* | 4/2002 | Thomas | G06F 3/0481 725/87 |
| 2002/0053078 A1* | 5/2002 | Holtz | G06Q 30/06 725/14 |
| 2002/0064149 A1* | 5/2002 | Elliott | H04L 12/14 370/352 |
| 2002/0073424 A1* | 6/2002 | Ward, III | H04N 5/44543 725/42 |
| 2002/0088009 A1 | 7/2002 | Dukiewicz et al. | |
| 2002/0104101 A1 | 8/2002 | Yamato | |
| 2002/0112249 A1 | 8/2002 | Hendricks et al. | |
| 2002/0120925 A1* | 8/2002 | Logan | A23L 2/52 725/9 |
| 2002/0120933 A1 | 8/2002 | Knudson et al. | |
| 2002/0131511 A1 | 9/2002 | Zenoni | |
| 2002/0162117 A1 | 10/2002 | Pearson | |
| 2002/0188628 A1 | 12/2002 | Cooper et al. | |
| 2003/0001880 A1 | 1/2003 | Holtz et al. | |
| 2003/0012548 A1 | 1/2003 | Levy | |
| 2003/0018609 A1 | 1/2003 | Phillips et al. | |
| 2003/0033157 A1 | 2/2003 | Dempski et al. | |
| 2003/0056224 A1 | 3/2003 | Stone | |
| 2003/0067554 A1* | 4/2003 | Klarfeld | G11B 27/105 348/461 |
| 2003/0093790 A1* | 5/2003 | Logan | G11B 27/34 725/38 |
| 2003/0093792 A1* | 5/2003 | Labeeb | H04N 7/163 725/46 |
| 2003/0101454 A1 | 5/2003 | Ozer et al. | |
| 2003/0126200 A1 | 7/2003 | Wolff | |
| 2003/0229900 A1* | 12/2003 | Reisman | G06F 16/954 725/87 |
| 2004/0003400 A1 | 1/2004 | Carney et al. | |
| 2004/0024898 A1 | 2/2004 | Wan | |
| 2004/0031058 A1* | 2/2004 | Reisman | G06F 16/954 725/112 |
| 2004/0220926 A1 | 11/2004 | Lamkin et al. | |
| 2004/0226051 A1* | 11/2004 | Carney | H04N 21/8545 725/135 |
| 2004/0244057 A1 | 12/2004 | Wallace et al. | |
| 2004/0260682 A1 | 12/2004 | Herley et al. | |
| 2004/0267738 A1* | 12/2004 | Shin | H04L 65/602 |
| 2005/0015815 A1 | 1/2005 | Shoff et al. | |
| 2005/0022226 A1 | 1/2005 | Ackley et al. | |
| 2005/0038794 A1* | 2/2005 | Piersol | H04N 21/8455 |
| 2005/0050218 A1* | 3/2005 | Sheldon | H04N 21/2743 709/231 |

(56) References Cited

U.S. PATENT DOCUMENTS

| | | |
|---|---|---|
| 2005/0060741 A1 | 3/2005 | Tsutsui et al. |
| 2005/0125428 A1 | 6/2005 | Kang et al. |
| 2005/0188402 A1 | 8/2005 | De et al. |
| 2005/0235318 A1 | 10/2005 | Grauch et al. |
| 2006/0015908 A1* | 1/2006 | Vermola ............ H04N 21/4722 725/63 |
| 2006/0174310 A1* | 8/2006 | Lee ..................... H04H 60/65 725/135 |
| 2006/0190336 A1* | 8/2006 | Pisaris-Henderson ................... G06Q 30/0256 725/32 |
| 2007/0011050 A1* | 1/2007 | Klopf ............... G06Q 30/0267 705/14.13 |
| 2007/0061838 A1 | 3/2007 | Grubbs |
| 2007/0088609 A1* | 4/2007 | Reller ............... G06Q 30/0256 705/14.71 |
| 2007/0124756 A1 | 5/2007 | Covell |
| 2007/0124789 A1 | 5/2007 | Sachson et al. |
| 2007/0127720 A1* | 6/2007 | White ................ H04N 7/1675 380/277 |
| 2007/0239558 A1* | 10/2007 | Miles .................. G06Q 30/02 705/14.69 |
| 2007/0250761 A1 | 10/2007 | Bradley et al. |
| 2007/0250901 A1 | 10/2007 | McIntire et al. |
| 2007/0274676 A1 | 11/2007 | Diomelli et al. |
| 2008/0017722 A1 | 1/2008 | Snyder et al. |
| 2008/0036917 A1* | 2/2008 | Pascarella ........... H04N 21/854 348/702 |
| 2008/0066100 A1* | 3/2008 | Brodersen ........... H04N 21/812 725/35 |
| 2008/0066110 A1 | 3/2008 | Brodersen et al. |
| 2008/0068500 A1 | 3/2008 | Krause |
| 2008/0071920 A1* | 3/2008 | Gupta ............... H04N 21/2335 709/231 |
| 2008/0092047 A1 | 4/2008 | Fealkoff et al. |
| 2008/0092168 A1* | 4/2008 | Logan ............... H04N 21/4782 725/44 |
| 2008/0113789 A1 | 5/2008 | Canessa et al. |
| 2008/0168133 A1 | 7/2008 | Osborne |
| 2008/0195746 A1 | 8/2008 | Bowra et al. |
| 2008/0209485 A1* | 8/2008 | Emura ................. H04N 21/84 725/105 |
| 2008/0228935 A1 | 9/2008 | Nam |
| 2008/0249853 A1 | 10/2008 | Dekel et al. |
| 2008/0255904 A1 | 10/2008 | Park et al. |
| 2008/0267588 A1* | 10/2008 | Iwase ................. G11B 27/105 386/248 |
| 2008/0294663 A1 | 11/2008 | Heinley et al. |
| 2008/0301727 A1* | 12/2008 | Cristofalo ............ G06Q 30/02 725/35 |
| 2008/0307454 A1 | 12/2008 | Ahanger et al. |
| 2008/0313229 A1 | 12/2008 | Taswell |
| 2009/0006191 A1 | 1/2009 | Arankalle et al. |
| 2009/0041418 A1* | 2/2009 | Candelore .......... H04N 21/8106 386/341 |
| 2009/0044246 A1* | 2/2009 | Sheehan ............ H04N 21/2221 725/146 |
| 2009/0113468 A1* | 4/2009 | Steelberg ............ G06Q 30/02 725/32 |
| 2009/0125812 A1* | 5/2009 | Blinnikka ........... G06F 16/4393 715/716 |
| 2009/0132371 A1* | 5/2009 | Strietzel ............. G06Q 30/02 705/14.46 |
| 2009/0150215 A1 | 6/2009 | Kalb et al. |
| 2009/0150947 A1 | 6/2009 | Soderstrom |
| 2009/0171948 A1 | 7/2009 | Solomon et al. |
| 2009/0204481 A1 | 8/2009 | Navar et al. |
| 2009/0216745 A1* | 8/2009 | Allard ............... G06F 17/30017 |
| 2009/0226152 A1 | 9/2009 | Hanes |
| 2009/0234815 A1 | 9/2009 | Boerries et al. |
| 2009/0235298 A1 | 9/2009 | Carlberg et al. |
| 2009/0240564 A1 | 9/2009 | Boerries et al. |
| 2009/0240734 A1* | 9/2009 | Lloyd-Jones .......... G11B 27/10 |
| 2009/0245058 A1 | 10/2009 | Goto et al. |
| 2009/0254962 A1 | 10/2009 | Hendricks et al. |
| 2009/0276821 A1* | 11/2009 | Amento ............ H04N 7/17318 725/116 |
| 2009/0285550 A1 | 11/2009 | Yamada et al. |
| 2009/0295993 A1 | 12/2009 | Chhokra |
| 2009/0307227 A1 | 12/2009 | Prestenback et al. |
| 2009/0328113 A1 | 12/2009 | van de Klashorst |
| 2010/0011392 A1 | 1/2010 | Bronstein et al. |
| 2010/0023968 A1 | 1/2010 | Wannamaker |
| 2010/0031299 A1* | 2/2010 | Harrang ............ H04N 21/4104 725/80 |
| 2010/0064311 A1 | 3/2010 | Cooper |
| 2010/0070643 A1* | 3/2010 | Puranik ............. H04N 21/8547 709/231 |
| 2010/0083306 A1 | 4/2010 | Dempski et al. |
| 2010/0088716 A1* | 4/2010 | Ellanti ................. H04N 5/85 725/32 |
| 2010/0106798 A1 | 4/2010 | Barreto et al. |
| 2010/0118206 A1* | 5/2010 | Gao ..................... H04H 20/57 348/723 |
| 2010/0135637 A1 | 6/2010 | McDermott et al. |
| 2010/0142915 A1 | 6/2010 | McDermott et al. |
| 2010/0146542 A1 | 6/2010 | Weihs et al. |
| 2010/0158099 A1 | 6/2010 | Kalva et al. |
| 2010/0161825 A1 | 6/2010 | Ronca et al. |
| 2010/0162286 A1 | 6/2010 | Berry |
| 2010/0169303 A1 | 7/2010 | Biderman et al. |
| 2010/0169460 A1 | 7/2010 | Angell et al. |
| 2010/0169910 A1 | 7/2010 | Collins et al. |
| 2010/0180289 A1* | 7/2010 | Barsook .............. G11B 27/005 725/29 |
| 2010/0205049 A1 | 8/2010 | Long |
| 2010/0228693 A1 | 9/2010 | Dawson et al. |
| 2010/0235472 A1* | 9/2010 | Sood ................. H04L 65/4092 709/219 |
| 2010/0241961 A1 | 9/2010 | Peterson et al. |
| 2010/0241962 A1* | 9/2010 | Peterson ............. G11B 27/34 715/720 |
| 2010/0246666 A1 | 9/2010 | Miazzo et al. |
| 2010/0274667 A1 | 10/2010 | Lanham et al. |
| 2010/0287580 A1 | 11/2010 | Harding et al. |
| 2010/0299199 A1 | 11/2010 | Kang |
| 2010/0299687 A1 | 11/2010 | Bertino-Clarke |
| 2010/0333152 A1 | 12/2010 | Redmann et al. |
| 2011/0044601 A1 | 2/2011 | Lee et al. |
| 2011/0058675 A1 | 3/2011 | Brueck et al. |
| 2011/0061001 A1 | 3/2011 | Jones et al. |
| 2011/0078623 A1 | 3/2011 | Liu et al. |
| 2011/0099225 A1 | 4/2011 | Osborne |
| 2011/0134321 A1 | 6/2011 | Berry et al. |
| 2011/0145880 A1 | 6/2011 | Wang |
| 2011/0154200 A1 | 6/2011 | Davis et al. |
| 2011/0178854 A1* | 7/2011 | Sofer ................. H04N 21/4314 705/14.4 |
| 2011/0196747 A1 | 8/2011 | Karidi et al. |
| 2011/0218851 A1 | 9/2011 | O'Hanlon |
| 2011/0238495 A1 | 9/2011 | Kang |
| 2011/0238507 A1 | 9/2011 | Ben-Rubi |
| 2011/0246622 A1 | 10/2011 | Pantos et al. |
| 2011/0246885 A1 | 10/2011 | Pantos et al. |
| 2011/0258529 A1 | 10/2011 | Doig et al. |
| 2011/0258545 A1 | 10/2011 | Hunter |
| 2011/0273455 A1* | 11/2011 | Powar ................ G10H 1/368 345/473 |
| 2011/0276372 A1 | 11/2011 | Spivack et al. |
| 2011/0319160 A1 | 12/2011 | Arn et al. |
| 2011/0321096 A1 | 12/2011 | Landow et al. |
| 2012/0011550 A1* | 1/2012 | Holland ............... H04N 21/40 725/78 |
| 2012/0102042 A1* | 4/2012 | Flick ................. G06F 16/41 707/746 |
| 2012/0109755 A1* | 5/2012 | Birch ................. G06Q 30/0269 705/14.66 |
| 2012/0110627 A1* | 5/2012 | Reitmeier ............. H04N 5/76 725/93 |
| 2012/0116883 A1 | 5/2012 | Asam et al. |

(56) References Cited

U.S. PATENT DOCUMENTS

| | | |
|---|---|---|
| 2012/0144417 A1* | 6/2012 | Khader .............. H04N 21/2221 725/32 |
| 2012/0158472 A1 | 6/2012 | Singh et al. |
| 2012/0167146 A1 | 6/2012 | Incorvia |
| 2012/0179536 A1 | 7/2012 | Kalb et al. |
| 2012/0192220 A1* | 7/2012 | Wyatt .............. H04N 21/26241 725/30 |
| 2012/0192225 A1* | 7/2012 | Harwell .............. H04N 21/2668 725/34 |
| 2012/0192227 A1 | 7/2012 | Fleischman et al. |
| 2012/0197419 A1* | 8/2012 | Dhruv ................ H04N 21/6543 700/94 |
| 2012/0203589 A1 | 8/2012 | Eggena et al. |
| 2012/0233646 A1 | 9/2012 | Coniglio et al. |
| 2012/0243850 A1 | 9/2012 | Basra et al. |
| 2012/0256762 A1* | 10/2012 | Greenberger ............ H04Q 9/00 340/870.03 |
| 2012/0290644 A1 | 11/2012 | Gabin et al. |
| 2012/0310750 A1 | 12/2012 | Schutzbank et al. |
| 2013/0011120 A1* | 1/2013 | Tanaka ................ H04N 21/4828 386/241 |
| 2013/0014155 A1 | 1/2013 | Clarke et al. |
| 2013/0024906 A9* | 1/2013 | Carney ................ H04N 21/482 725/135 |
| 2013/0036007 A1* | 2/2013 | Lau ........................ G06Q 30/02 705/14.49 |
| 2013/0070152 A1* | 3/2013 | Berkowitz ........... H04N 21/235 348/500 |
| 2013/0071090 A1* | 3/2013 | Berkowitz ........... H04N 9/7921 386/248 |
| 2013/0074141 A1 | 3/2013 | Hwang et al. |
| 2013/0077876 A1* | 3/2013 | Tanaka ................ G06K 9/00758 382/224 |
| 2013/0091518 A1 | 4/2013 | Trainor |
| 2013/0095864 A1 | 4/2013 | Marovets |
| 2013/0097190 A1* | 4/2013 | Shah ..................... H04N 21/262 707/754 |
| 2013/0104179 A1* | 4/2013 | Shah ..................... H04N 21/242 725/115 |
| 2013/0132818 A1 | 5/2013 | Anders et al. |
| 2013/0132854 A1* | 5/2013 | Raleigh ................. G06F 3/0482 715/738 |
| 2013/0170753 A1* | 7/2013 | Tanaka .................. G06F 16/785 382/190 |
| 2013/0170813 A1* | 7/2013 | Woods ................... H04N 5/765 386/200 |
| 2013/0176493 A1* | 7/2013 | Khosla .................... H04N 5/04 348/563 |
| 2013/0183021 A1 | 7/2013 | Osman |
| 2013/0191745 A1* | 7/2013 | Vella ........................ G06F 3/01 715/716 |
| 2013/0198642 A1* | 8/2013 | Carney ................ H04N 21/482 715/738 |
| 2013/0204698 A1* | 8/2013 | Bryant ................ G06Q 30/0267 705/14.51 |
| 2013/0254340 A1 | 9/2013 | Lang et al. |
| 2013/0262997 A1 | 10/2013 | Markworth et al. |
| 2013/0293677 A1* | 11/2013 | Lee ..................... H04N 21/4345 348/43 |
| 2013/0332839 A1 | 12/2013 | Frazier et al. |
| 2013/0347018 A1* | 12/2013 | Limp ................. H04N 21/4826 725/19 |
| 2014/0009680 A1* | 1/2014 | Moon ................ H04N 21/4316 348/563 |
| 2014/0046775 A1 | 2/2014 | Harb |
| 2014/0089967 A1 | 3/2014 | Mandalia et al. |
| 2014/0149918 A1* | 5/2014 | Asokan .............. G06Q 30/0255 715/783 |
| 2014/0157307 A1 | 6/2014 | Cox |
| 2014/0180829 A1 | 6/2014 | Umeda |
| 2014/0181868 A1* | 6/2014 | O'Callaghan ...... H04N 21/4821 725/39 |
| 2014/0310243 A1 | 10/2014 | McGee et al. |
| 2014/0327677 A1* | 11/2014 | Walker .................. G06T 11/206 345/440 |
| 2014/0337127 A1 | 11/2014 | Morel |
| 2014/0365302 A1* | 12/2014 | Walker .................. G06T 11/206 705/14.53 |
| 2015/0003798 A1* | 1/2015 | Walker ............. H04N 21/42204 386/201 |
| 2015/0019644 A1* | 1/2015 | Walker .................. G06T 11/206 709/204 |
| 2015/0020096 A1* | 1/2015 | Walker .................. G06T 11/206 725/34 |
| 2015/0134673 A1* | 5/2015 | Golan ..................... G06F 16/44 707/748 |
| 2015/0135206 A1* | 5/2015 | Reisman .......... H04N 21/26283 725/18 |
| 2015/0135214 A1* | 5/2015 | Reisman .......... H04N 21/64322 725/37 |
| 2015/0199968 A1 | 7/2015 | Singhal et al. |
| 2015/0237386 A1* | 8/2015 | Sheehan ............ H04N 21/2668 725/34 |
| 2015/0237389 A1 | 8/2015 | Grouf et al. |
| 2015/0245111 A1 | 8/2015 | Berry et al. |
| 2015/0281763 A1* | 10/2015 | Bertrand ............ H04N 21/2353 725/32 |
| 2015/0289030 A1 | 10/2015 | Roberts et al. |
| 2016/0127776 A1* | 5/2016 | Zilberstein ........... H04N 21/458 725/34 |
| 2016/0182923 A1* | 6/2016 | Higgs ............... H04N 21/23424 725/34 |
| 2016/0191957 A1* | 6/2016 | Teixeira ........... H04N 21/23418 725/32 |
| 2016/0234295 A1 | 8/2016 | Ziring et al. |
| 2016/0322081 A1 | 11/2016 | Schileru |
| 2017/0013314 A1* | 1/2017 | Mallinson .......... H04N 21/4722 |
| 2017/0041644 A1* | 2/2017 | Dalrymple ............. H04N 21/84 |
| 2017/0041648 A1* | 2/2017 | Dalrymple ......... H04N 21/4316 |
| 2017/0041649 A1* | 2/2017 | Dalrymple ....... H04N 21/23424 |
| 2017/0201850 A1* | 7/2017 | Raleigh ................... H04W 4/50 |
| 2017/0295386 A1 | 10/2017 | Owen et al. |
| 2017/0339462 A1 | 11/2017 | Clarke |
| 2017/0344439 A1* | 11/2017 | Howe ................. G06F 11/1471 |
| 2018/0014077 A1* | 1/2018 | Hou ................. H04N 21/26233 |
| 2019/0107906 A1 | 4/2019 | Berry et al. |
| 2019/0146742 A1 | 5/2019 | Li et al. |
| 2019/0349619 A1* | 11/2019 | Hou ...................... H04N 21/251 |
| 2020/0068256 A1 | 2/2020 | Gordon |
| 2021/0068335 A1 | 3/2021 | Noivirt-Brik et al. |

FOREIGN PATENT DOCUMENTS

| | | |
|---|---|---|
| WO | WO 2012/094432 A1 | 7/2012 |
| WO | WO 2012/094539 A2 | 7/2012 |
| WO | WO 2012/174301 A1 | 12/2012 |

OTHER PUBLICATIONS

US Patent Application filed on Jul. 25, 2016, entitled "System to Select Supplemental Content for Playback Devices", U.S. Appl. No. 62/366,540.

US Patent Application filed on Jul. 14, 2016, entitled "Metadata Delivery System for Rendering Supplementary Content", U.S. Appl. No. 62/362,587.

US Patent Application filed on Jun. 14, 2011, entitled "System and Method for Presenting Content with Time Based Metadata", U.S. Appl. No. 61/497,023.

US Patent Application filed on Oct. 22, 2016, entitled "Supplemental Content Playback System", U.S. Appl. No. 15/331,815.

International Search Report and Written Opinion, International Application No. PCT/US2012/020239, Date of Mailing Apr. 24, 2012, 9 Pages.

International Search Report and Written Opinion, International Application No. PCT/US2012/020387, Date of Mailing Jul. 10, 2012, 11 Pages.

International Search Report and Written Opinion, International Application No. PCT/US2012/042541, Date of Mailing Aug. 31, 2012, 9 Pages.

(56) References Cited

OTHER PUBLICATIONS

US Patent Application filed on Apr. 23, 2020, entitled "Interface for Displaying Supplemental Dynamic Timeline Content", U.S. Appl. No. 15/929,300.

* cited by examiner

METADATA DELIVERY SYSTEM FOR RENDERING SUPPLEMENTARY CONTENT

RELATED APPLICATIONS

This application claims benefit of priority to (i) Provisional U.S. Patent Application No. 62/362,587; filed Jul. 14, 2016; and (ii) Provisional U.S. Patent Application No. 62/366,540; filed Jul. 25, 2016; each of the aforementioned priority provisional applications being incorporated by reference in their respective entirety.

This application is a continuation-in-part of U.S. patent application Ser. No. 13/738,551, filed Jan. 10, 2013, which claims benefit of priority to Provisional U.S. Patent Application 61/631,814, filed Jan. 10, 2012; the aforementioned priority application being incorporated by reference in its entirety.

This application is a continuation-in-part of U.S. patent application Ser. No. 13/523,829, filed Jun. 14, 2012; which claims benefit of Provisional U.S. Patent Application No. 61/497,023, filed Jun. 14, 2011; the aforementioned priority application being hereby incorporated by reference for all purposes.

TECHNICAL FIELD

Examples described herein relate to a metadata delivery system for rendering supplementary content.

DETAILED DESCRIPTION

Figure 1:
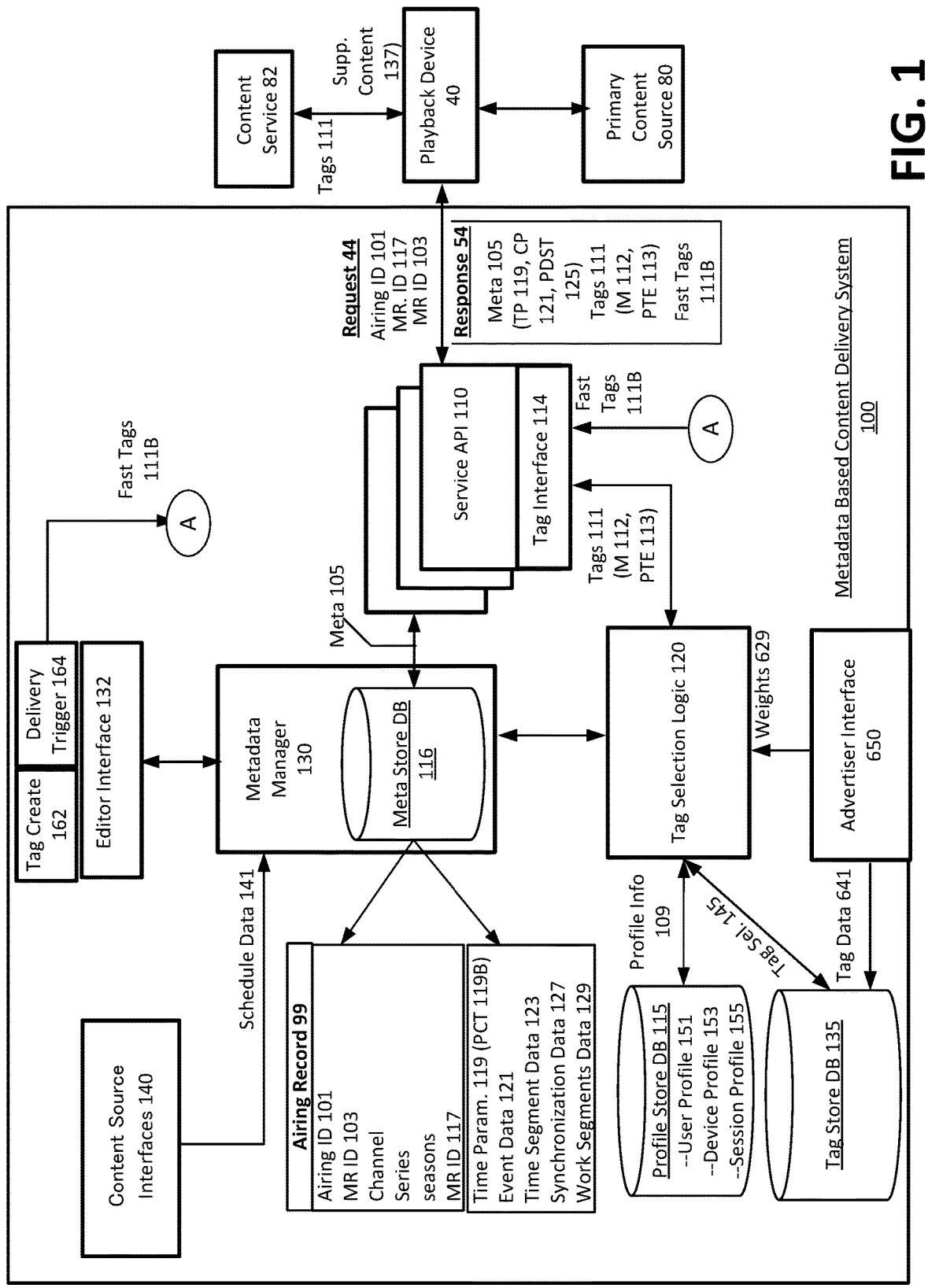
FIG. 1 illustrates an example system for providing time-based metadata, according to one or more embodiments.

Some examples include a system and method for providing supplemental content with airings of programming media. In such examples, a computer system (e.g., such as provided for a network service) operates to determine an inventory of time slots for a given airing. The computer system assigns a supplemental content item to a time slot of the given airing when the given airing is rendered on at least some of a plurality of playback devices. The computer system may structure a tag element to include data that is specific to a third-party, and then communicate a plurality of tags that include the tag elements to playback devices that are (or will) render the primary content of the airing.

Some examples include a computer system and method for operating a network service to provide content. The computer system operates to determine a media resource that a playback device has requested for playback. The playback device may be provided with a set of time-based metadata that is associated with the media resource, where the set of time-based metadata are correlative to a timeline of events in a playback of the media resource, including start time when the playback initiates, the set of time-based metadata identifying a predetermined available time slot during the playback of the media resource. The playback device may be provided with a programmatic resource for retrieving a supplemental content resource and rendering a corresponding supplemental content during the predetermined available time slot.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be carried and/or executed. In particular, the numerous machines shown in some examples include processor(s) and various forms of memory for holding data and instructions. Examples of computer-readable media include permanent memory storage devices, such as hard drives on personal computers or servers. Other examples of computer storage media include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable media.

The term "media resource" may include any data source from which a primary content can be generated as audio and visual content. According to some examples, a media resource can be accessed from a corresponding media file, media stream or media transmission (e.g., broadcast).

A "primary content" includes, for example, a work (e.g., a television program, a movie, etc.) or a live broadcast. The primary content can be identified by a content identifier, which can identify the content of the work independent of a channel or distribution medium. Other identifiers may also be associated with the primary content, such as a channel or distribution identifier, one or multiple types of group identifiers and one or more multiple types of publication identifiers (e.g., time of publication, publication source, geographic region, distribution channel, etc.). For example, a work may be associated with a series identifier, a season identifier, and an episode identifier. When a work is broadcast, the work may also be associated with an airing identifier, identifying a time, location and organization of the distribution.

System Overview

FIG. 1 illustrates an example system for providing time-based metadata, according to one or more embodiments. According to an example of FIG. 1, a metadata delivery system ("MDDS 100") is provided as a network service that can communicate with any one of a plurality of playback devices, represented by a playback device 40, in order to provide time-based metadata that is synchronized to the playback of primary media content on the device. The time-based metadata can include content and/or programmatic resources for triggering a playback device to retrieve and include supplemental content at preselected times in a duration in which the primary content is played back.

In an implementation of FIG. 1, the MDDS 100 is implemented as a network service. For example, the MDDS 100 may be implemented on one or more servers that communicate with playback devices utilized by a population of users. According to some examples, the MDDS 100 operates to provide individual playback devices with a time-based metadata set 105 that is specific to a particular airing of a media resource. The time-based metadata set 105 can include metadata that is renderable on a given playback device to display supplemental or ancillary content during or concurrently with playback of a primary content. Additionally, in some implementations, the metadata set 105 includes data to enable the playback device 40 to retrieve metadata content that can be rendered as supplemental or ancillary content. In some variations, the metadata set 105 may also include executable data, such as instructions or parametric data, for triggering playback devices to perform operations that include retrieval of supplemental content from network services. The metadata set 105 may be provided from the MDDS 100 in connection with corresponding airings of media resources originating from different media sources, including media sources that are transmitted to the MDDS 100 and/or playback device 40 over different transmission mediums (e.g., broadcast television, cable television via set-top box, streaming subscription service via web-based application) and/or different content delivery platforms (e.g., broadcasts transmitted through head-end services for set-top boxes, broadcasts streamed over Internet connections, on-demand selections, transmissions of requested content over browser or applications operated by users, etc.).

According to some examples, the MDDS 100 includes one or multiple system APIs 110, a metadata manager 130, and one or multiple content source interfaces 140. The MDDS 100 can provide one or more multiple system APIs 110, so that specific computing platforms and environments are compatible with the MDDS 100. Thus, in an example of FIG. 1, the playback device 40 can operate under any one of multiple possible platforms, in order to receive data from the MDDS 100. Additionally, the system API 110 can be specific to a particular transmission medium and/or content delivery platform. Thus, for example, the MDDS 100 may construct and make available system API(s) 110 to provide time-based metadata in connection with an airing transmitted through any of (i) a head-end to a user's set-top box (e.g., television programs), (ii) an over-the-air broadcast, (iii) a content provider (e.g., streaming service) via a network connection to a user's web-based media player, or (iv) a remote source or network site (e.g., video service site accessible via browser). In some variations, the MDDS 100 provides a metadata set 105 in connection with stored media files which the user elects to playback on the playback device 40. The playback device 40 may correspond to one of multiple possible types, distinguished by, for example, a transmission medium, content delivery system and/or platform used to receive and render media resources.

In some examples, the constituent data sets of the metadata set 105 may include a set of time slot parameters 119, content parameters 121, and one or more payload data set 125. The time slot parameters 119 can reference specific moments during the playback of the corresponding media resource (also termed the "primary content") which provide a point for synchronization as between a timer for the metadata set 105 and a timeline of the primary content. In some variations, the time slot parameters 119 can also define time slots (sometimes referred to as "avails") which are predetermined durations in the timeline of the primary content during which supplemental content can be displayed.

Accordingly, in some examples, the time slot parameters 119 identify pre-determined moments relative to a timeline of the corresponding primary content ("primary content timeline" or "PCT 119B"). The time slot parameters 119 may also be used to define pre-determined time slots. Still further, the time slot parameters 119 can define time slots which are individual associated with a corresponding identifier 129 (e.g., unique identifier or UID). In some variations, the time slot parameters 119 can also reference predetermined segments of the primary content where breaks for commercials or other supplemental content may occur. In this way, the timing parameters 1PCT 119B) can be used to identify predefined slots and/or events of interest in the playback of primary content (e.g., "avails"). For example, an airing of the record 99 may be pre-divided into work segments to define specific locations where supplemental content (e.g., advertisements) can be inserted. The work segments can define, for example, a duration of time between designated break points (e.g., where commercial breaks are shown). In this context, the time slot parameters 119 can be used to identify for example, a start and end time of a particular time slot, as well as a payload data set 125 for use in the time slot.

The content parameters 121 can reference events within the rendering of the primary content which are associated with the primary content. By way of example, the content parameters 121 can reference events such as the appearance of an individual or object in the airing of the primary content. Accordingly, the content parameters 121 can also reference markers in time, as defined by one or more time slot parameters 119.

The payload data set 125 can include pre-selected content items which are to be displayed concurrently (e.g., as an overlay) and/or sequentially (e.g., as a commercial between segments of an airing). In some examples, the payload data set 125 can be linked to the time slot parameters 119, which dictate relative moments or durations in the timeline 119B of the primary content during which the payload data set 125 is to be rendered or used. In some examples, the payload data set 125 can be retrieved during playback of a given media resource, so that the payload data set 125 is selected and rendered at a playback time that is defined by the time slot parameters 119. Still further, in some examples, the payload data set 125 can be linked with the content parameters 121 of the primary content, such as individuals, locations, objects or other events which occur during the playback of the primary content. The payload data set 125 may be selective, so as to appear when certain conditions occur (e.g., user input).

The payload data set 125 can be provided in a variety of forms or data structures. For example, the payload data set 125 can be structured as an overlay that appears concurrently with the playback of the airing. Alternatively, the payload data set 125 can appear in the form of a commercial which appear sequentially once a segment of the primary content is rendered.

In some examples, the metadata set 105 may also include synchronization data 127. The synchronization data 127 can define or otherwise provide a time reference or resource for enabling the playback device 40 to playback the playback the primary content while synchronizing the rendering of supplemental content provided with or through the metadata set 105. In an example of FIG. 1, the MDDS 100 utilizes the one or more content source interfaces 140 to receive scheduling data 141 from one or more content sources. By way of example, the content sources can include content providers (e.g., television stations) who broadcast television programming to set-top boxes or other types of receivers. As an addition or alternative, the content providers can correspond to streaming services, which can broadcast or otherwise make various types of programming available over a network connection (e.g., using an IP protocol). Such content sources can publish schedules when certain airings are being played back.

In some examples, the metadata set 105 provided by the MDDS 100 may include programmatic elements, shown as tags 111, which trigger the playback device 40 to perform operations for retrieving and utilizing supplemental content with a corresponding primary content. In one implementation, the playback device 40 makes the request 44 to receive the metadata set 105, from which the playback device 40 can extract identifiers (e.g., time slot identifiers 119), and the tags 111. Thus, the metadata set 105 may include or package tags 111 as part of the metadata set 105.

In variations, the playback device 40 makes multiple requests from the system API 110 during playback of the primary content, and at least some of the responses 54 may include tags 111. In some examples, the service API 110 can include, or may be coupled with, tag interface logic 114. The tag interface logic 114 may manage inclusion of tags 111 in responses 54 to the playback device 40. The tag interface logic 114 may be responsive to requests 44 received through the system API 110 in providing the playback device 40 with one or more tags 111, either before or during the playback of the primary content on the playback device 40. As described in greater detail, the playback device 40 may utilize each tag 111 to retrieve supplemental content from a network source.

In variations, the tag interface logic 114 may operate as a separate component, rather than as an integrated component of the system API 110. Still further, the tag interface logic 114, tag selection logic 120 and tag store database 555 may reside as a separate and/or independent entity from the MDDS 100. In some variations, the MDDS 100 may provide identifiers (e.g., time slot identifiers 119) which the playback device 40 can use to retrieve tags 111 from a separate or independent service.

The tag selection logic 120 provides logic to select tags 111 for the playback device 40. The tag selection logic 120 can select tags from a tag data store 135. The tags 111 can be individually structured to trigger the playback device 40 to perform operations to retrieve supplemental content data 137 from a network service or other third-party content service 82. By way of example, individual tags 111 can be structured as a link or Uniform Resource Locator (URL) to cause a playback component to access a network site. According to some examples, the MDDS 100 can leverage existing ad networks and services by including, with the metadata set 105, tags 111 that trigger the playback device 40 to request and receive the supplemental content data 137 from an ad network or service. As described with some examples, the use of tags 111 enable the MDDS 100 to customize or personalize the selection of supplemental content 137 for users or playback devices, based on a variety of factors such as geographic location, type of device or platform in use, preference of the user and/or other user profile information. The selection of tags 111 can also be based on other considerations and/or objectives of the MDDS 100, such as attributes or characteristics of the media resource or airing, as well as contextual information about the user, playback device or airing.

The metadata manager 130 maintains a meta-database metadata store 116 to store metadata for numerous media resources and/or respective airings of media resources. In one implementation, the metadata store 116 maintains individual media records 99, and each media record links metadata set 105 with a media resource and/or airing of the media resource. According to some examples, the individual media records 99 each link an airing identifier 101 and/or media resource identifier 103 to constituents data sets of the metadata set 105.

In an embodiment, the playback device 40 can be operated by a user to playback a particular airing of a media resource of the user selection. While some examples may provide for the media resource of the airing to be transmitted from the MDDS 100 to the playback device 40, other examples provide for metadata set 105 to be transmitted from a network service (e.g., the MDDS 100 operating as an independent network service) that is separate from the source that provides the playback device 40 with the airing. In one implementation, the playback device 40 can interface with a primary content source in order to request an airing of primary content 85 for playback on the playback device 40. By way of example, the playback device 40 can select the particular primary content source 80, and signal a channel selection or on-demand selection to a set-top box. As an addition or variation, the playback device 40 can make a media file selection from a network streaming source.

In some examples, the metadata manager 130 includes an editor interface 132 which receives input 133 from a publisher class user or customer. The input 133 can specify an object or event that is to be marked by a content parameter 121 for the record 99 of that airing. The content parameter 121 can be specific to, for example, a frame of the airing and/or a particular visible event (e.g., person appearing in primary content, object). The content parameter 121 may also be linked with a timing parameter 119 that identifies when the event specified by the user occurs with respect to the timeline 119B of the primary content. In some variations, the input 133 can also enable, for example, a content publisher (e.g., producer for program) or publisher class user to specify control over the type of supplemental content which can be provided in connection with the primary content.

In some examples, the playback device 40 can signal a request 44 to the MDDS 100 for the metadata set 105 that is to accompany a particular airing. In one example, the playback device 40 can signal an airing identifier 101. In some examples, the airing identifier 101 can be in the form of an airing key 103. The system API 110 can receive the request 44 from the playback device 40, with the specified airing ID 101. The request 44 can be signaled contemporaneously or concurrently with the playback device 40 requesting and/or receiving data for playing back a primary content from a primary content source 82.

The metadata manager 130 may respond to the request 44 by identifying the particular media record 99 that matches the airing identifier 101. In variations, the request 44 may specify a media resource identifier 103, along with other contextual information about content source, time of request, transmission medium and/or content delivery system. Based on the information provided with the request 44, the metadata manager 130 returns a metadata set 105, from which the metadata manager 130 is able to identify a corresponding media record 99. Depending on implementation, the metadata data set 105 may have alternative forms, structures and/or content type, while including or providing time-based metadata that is specific to the particular media resource (as provided by the media resource identifier 103) or airing (as provided by the airing identifier 101).

The system API 110 may return a response 54 that includes metadata set 105 for the airing identifier 101. The metadata set 105 may include information from the media record 99 associated with, for example, the airing identifier 101. In particular, the metadata set 105 can include the time slot parameters 119, content parameters 121 and/or payload data set 125. In some implementations, the response 54 may also include tags 111, which can be retrieved by the service API 110 via the tag interface logic 114.

In some examples, the time slot parameters 119 include the time slot identifiers 129. In one implementation, each time slot identifier 129 is unique, so that a corresponding time slot is uniquely identified from all other pre-determined time slots of the airings and media resources managed through the metadata manager 130. The playback device 40 may receive the metadata set 105, extract the time slot identifiers 129 and communicate the time slot identifiers 129 back to the API interface 110 and/or tag interface 114. In some variations, the playback device 40 communicates additional data, including the airing identifier 101 and/or media resource identifier 103. As an addition or alternative, the playback device 40 may communicate a user or device identifier.

The tag interface 114, when operating either as part of the service API or as a separate component (or as part of a separate system) may access or use tag selection logic 120 to select the set of tags 111 for playback device 40. Thus, the tags 111 may be selected as part of the response 54, in response to the request 44. Alternatively, the tags 111 may be selected a part of a supplemental response 56 that is communicated to the playback device 40, via the service API 110 or through the tag interface 114. As described with other examples, the tags 111 may be used by the playback component 40 to obtain a supplemental data set 137 from one or more third-party sources 82 (e.g., ad networks). In some examples the tags 111 may differ from the metadata set 105 because individual tags may reference a third-party source from which the playback device 40 is to retrieve a corresponding supplemental data set 137 when a corresponding airing is viewed. Still further, in some examples, the tags 111 may exist independent of a metadata set or media resource. For example, the tags 111 may include parameters that are not specific to the media resource or airing, but may be more descriptive of, for example, a classification of the user and/or type of supplemental content that is to be rendered with the primary content.

The tag selection logic 120 can select tags 111 for the playback device 40 using one or multiple selection criteria 145. By way of example, the selection criteria 145 may include (i) the media resource identifier 103 and/or airing identifier 101 being requested by the playback device 40, and/or (ii) user or device specific information, such as user profile information 109 and/or contextual information. Depending on implementation, the selection criteria 145 may originate from the playback device 40 at the time of request 44, or the information may be stored as part of the MDDS 100 (e.g., profile information 109).

As an alternative or variation, the playback device 40 may include a component that stores a data set that identifies profile or contextual information about the playback device 40 and/or user. The profile information 109 can indicate information about preferences of the user. Contextual information can identify information about a setting or condition that was present during the playback. The profile information 109 and the contextual information may be used by the tag selection logic 120 to determine tag selection criteria for the user. By way of example, the playback device 40 may record and/or store profile information 109 about prior activities of the user, and the playback device 40 may communicate parameters that are indicative of the profile and/or contextual information as part of the request 44, or as part of a sequence of communications from which playback the tags 111 are retrieved.

In some variations, the MDDS 100 may include a user profile store 115 to maintain profiles for the playback device 40 and/or its users, including prior activities of a user. The prior activities can, for example, specify a genre of preference, a favorite television series, or other attributes. In other examples, the prior activities of the user can include the user interaction with, for example, event data 121 rendered by the playback device 40 during playback. For example, the supplemental content that is rendered on the user screen can be made selectable, through user interaction with the content rendering on the playback device 40. Still further, as another example, the profile information can include a user profile 151 with information obtained from the user or from a third party source, such as the user's age group, gender and/or interests. The profile information can also include a device profile 153 for playback device 40, which can store information such as the type of device, supported features, software versions, etc. The profile information can further include a session profile 155 for the user's current session with the MDDS 100, which can be used for state-based information, security authentication, etc.

According to some examples, each tag 111 can cause the playback device 40 to retrieve a supplemental content data set 137 from a remote source 82. An individual tag 111 can, for example, identify to the playback device 40 (e.g., to the retrieval component of the playback device 40) an advertisement source from multiple possible sources. In some variations, the tag 111 can also identify a selection criteria which can be communicated from the playback device 40 to the identified advertisement source. In this way, the playback device 40 can use the tags 111 to retrieve supplemental content data sets 137 (e.g., media data for advertisements and promotions) from an advertising network for display with the content of the airing. By way of example, the selection of tags 111 for the playback device 40 may specify an advertisement network, and one or more parameters that are specific to the advertisement network. As an addition or alternative, the tags 111 can identify a campaign or content source which the playback device 40 is to use when obtaining supplemental content.

With further reference to an example of FIG. 1, each tag 111 may provide or enable a trigger mechanism that causes the playback device 40 to retrieve a supplemental content item for inclusion in the playback of the media resource identified with the airing identifier 101. In some implementations, the tag 111 includes a time marker 112 and a programmatic trigger element 113. The time marker 112 may synchronize to the time of the primary content, so as to correspond to a time in the playback of the primary content when a trigger event is to occur. The trigger element 113 can identify a location and/or resource for the trigger event. In some examples, the trigger event can correspond to one or more of (i) the playback device 40 retrieving a supplemental content data set 137, and/or (ii) the playback device 40 rendering and/or providing content and/or functionality using the supplemental content data set 137. Accordingly, the location identified by the trigger element 113 can include a remote source (e.g., located with a network address), local source (e.g., local memory address) or local network source (e.g., peripheral device). In some examples, the location identified by the trigger element is for an ad network or service. The resource can specify data that enables selection of the supplemental data set 137. For example, the resource can identify information associated with a corresponding tag 111, or otherwise provided from the MDDS 100, to enable a remote service to select an appropriate supplemental data set 137 for the playback device 40.

In some variations, the playback device 40 may render content from the supplemental content data set 137 that includes a structure of an overlay, or other content structure that can be concurrently displayed with playback of the primary content. In variations, the supplemental content data set 137 can identify commercials or content that inserts between, for example, the segments of the airing.

In order to ensure the supplemental content data set 137 is rendered at the correct playback time, the playback device 40 synchronizes a timeline of the metadata set 105 with a timeline 119B of the selected media resource (for primary content). For example, the playback device 40 may initiate a timer that is synchronized with a particular event detected from the playback of the media resource, and/or with an external timing reference such as provided by the broadcast schedule. When the timeline of the metadata set 105 is synchronized with the playback time, the playback device 40 can use the metadata set 105 to perform operations for rendering the supplemental content at the appropriate times of the playback. Depending on the implementation, the tags 111 can be received when the media resource or airing is requested by the playback device 40, or when the media resource or airing is being played back by the playback device 40. In some variations, the playback device 40 can make just-in-time requests for supplemental content using the tags 111. Still further, in some variations, the tags 111 can be retrieved and stored during a prior session, then read from memory to cause the playback device 40 to perform a corresponding retrieval action.

Some variations may include functionality to render time-sensitive supplemental content in connection with, for example, "live television" (e.g., sporting event, political event, etc.). In such context, the supplemental content may be commercial (e.g., advertisement) or an enhancement to the primary content. Additionally, as with other examples, the supplemental content may be interactive. For example, during a sporting event, the supplemental content may be displayed as an overlay of the primary content, and in the form of interactive content in which viewers are invited to vote on an event that just occurred (e.g., "Which player was the best performer?"). As described with other examples, the MDDS may deliver tags 111 for enabling the playback device 40 to retrieve supplemental content that is selected for delivery to the playback device 40 in real-time (or near real time). For example, tags 111 may be delivered to the playback device 40 for purpose of enabling the playback device 40 to render supplemental content that is selected or responsive to events of the live broadcast.

In some examples, the tag interface 114 includes or communicates with a tag creation tool 162 and a delivery trigger 164. An operator, such as a provider of the primary content, can interact with the tag creation tool 162 to create one or more fast-delivery tags 111B. In one implementation, the tag creation tool 162 and the delivery trigger 164 may be included with, or coupled with the editor interface 132, so that editors whom specify metadata content 105 may also specify creation of fast tags 111B.

According to some examples, the operator specifies input for the fast-delivery tag 111B that corresponds to a network location (e.g., URL). In some variations, the input for the tag creation tool 162 includes supplemental content (e.g., overlay content), which can be packaged with the tag. The operator can signal the delivery trigger 164, via the tool 162, to deliver the tag 111B to playback devices 40 which are connected to the MDDS 100. In variations, the tag creation tool 162 can interact with a programmatic entity that is able to provide input and/or trigger the delivery trigger 164.

The delivery trigger 164 may, for example, initiate a communication to each playback device 40 that is deemed to be rendering the desired primary content. In one implementation, the delivery tool 164 may cause each of the identified playback devices 40 to make a new request 54 of the system API 110 for the tag 111B. Alternatively, the delivery tool 164 may cause the system API 110 to push the tag 111B to each of the playback devices 40. The MDDS 100 may maintain, for example, a list of connected playback devices and the airing or media resource identifier 101, 103 most recently communicated by each playback device 40. In this way, the tag 111B may be instantly communicated, in near-real time from when the delivery tool 164 is invoked, to those devices which are viewing the desired live content. In some variation, the system API 110 can exchange communications with connected playback devices before transmitting the fast tag 111B.

Figure 6:
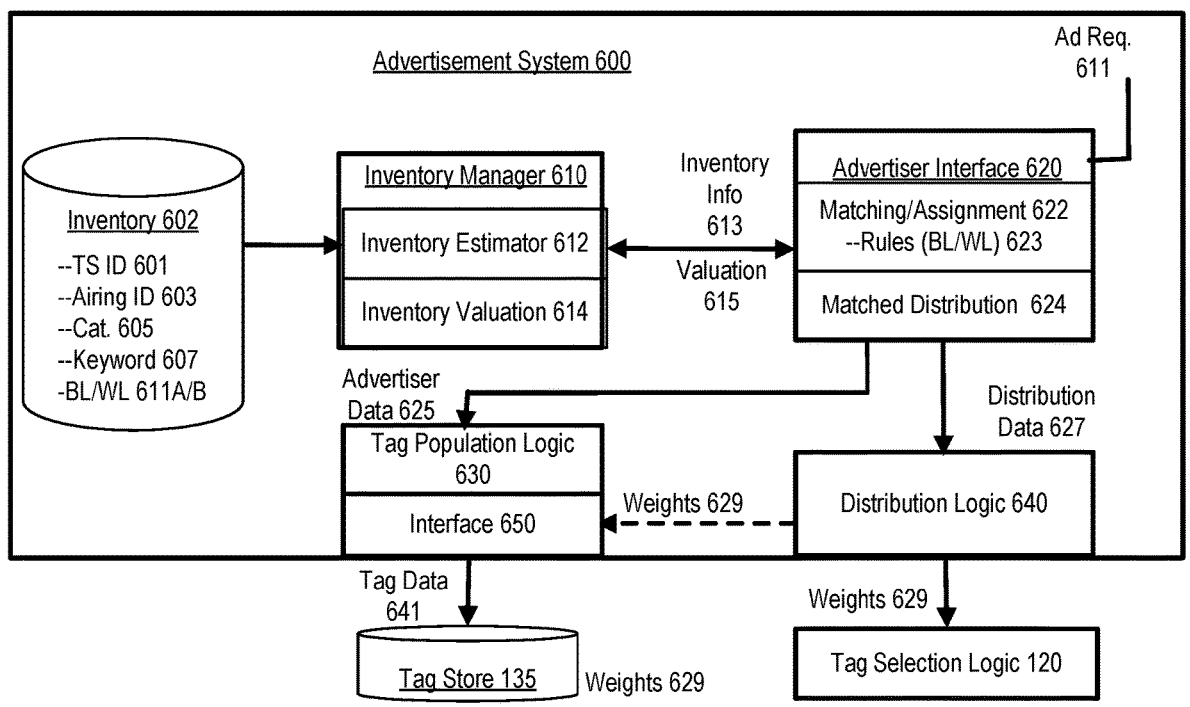
FIG. 6 illustrates an example system for selecting supplemental metadata content, according to one or more embodiments.

In some examples, an advertiser interface 660 may be integrated with the MDDS 100 in order to populate and distribute tags 111 in accordance with advertisement campaigns that are purchased and managed through an advertisement system 600 (see FIG. 6). As described with other examples, the advertisement system 600 can provide weights 629 for tag selection logic, and tag data 641 to enable distribution of content specified by campaigns.

Figure 2:
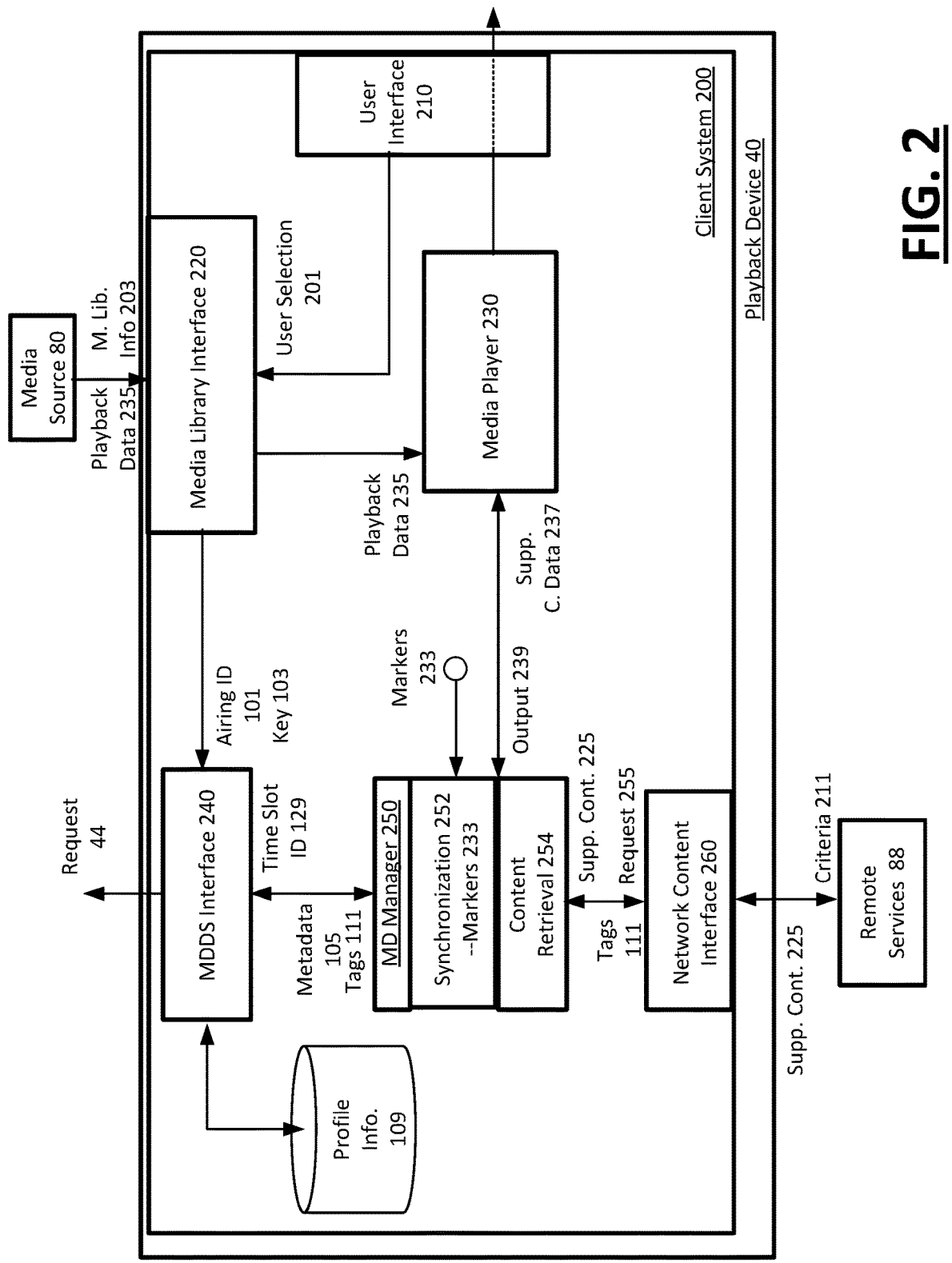
FIG. 2 illustrates an example client system for use with a playback device, according to an embodiment.

FIG. 2 illustrates an example client system for use with a playback device, according to an embodiment. According to some examples, the client system 200, as shown with an example of FIG. 2, represents software and/or logic to enable a computing device to operate as a playback device 40, and further to receive and utilize metadata and services provided through the MDDS 100.

In some examples, the playback device 40 can correspond to a multifunctional computing device capable of a variety of tasks, such as Internet browsing, messaging, voice or telephony operations, or web-based applications and functionality. For example, the playback device 40 can correspond to a tablet, smartphone, laptop, or desktop computer which can utilize the service application to connect to a streaming content provider (e.g., Netflix, who, HBO etc.). In variations, the playback device 40 can correspond to a set-top box, smart television, peripheral connected streamer (e.g., ROKU device manufactured by ROKU, INC., APPLE TV manufactured by APPLE INC.), or other device capable of receiving broadcast programming, such as provided through cable systems, satellite broadcast, over the air broadcast or other broadcasting application meetings.

Still further, some examples provide that the client system 200 can be implemented in part by a service application, such as an "app" downloaded from an "app store." As a service application, the client system 200 may connect to a network service over the Internet in order to exchange data and receive services. The client system 200 may also perform other tasks, such as communicating a user or account identifier to a network service, maintaining and communicating profile or activity date to the network service, and/or integrating or communicating with a media player in order to render content. In variations, the client system 200 can be implemented through multiple applications or application processes. For example, the playback device 40 can be implemented as an application and plug-in, or by a browser and in-browser application.

In an example of FIG. 2, the client system 200 includes a user interface 210, a media library interface 220, a media player 230, a system interface 240, a metadata manager 250 and a network content interface 260. The user interface 210 represents an abstraction of user-facing features which can receive user input. The user interface 210 can enable the user to interact with a media library or media source 82 and/or metadata based content delivery system 100 such as shown with an example of FIG. 1. In an example of FIG. 2, a user interacts with a user interface 210 to make a selection 201 of a media resource, and the selection 201 can trigger the client system 200 to retrieve metadata content from the MDDS 100. In one implementation, the media library interface 220 can interface with a media source 80 to receive media library information 203, and the media library information 203 can be displayed or rendered to the user via the user interface 210. A user can view the media library information 203 and provide input to make a selection 201 of a media resource and/or navigate through a media library or selection interface. Depending on the implementation, the interaction may be through, for example, a keyboard or peripherally connected device, a dedicated input mechanism (e.g., remote control device), a touchscreen and/or a gesture/motion detection mechanism integrated with the playback device 40.

In an example of FIG. 2, the client system 200 implements a primary process to playback primary content synchronously with an ancillary process that renders supplemental content from one or multiple sources. In the primary process, the media resource of the selection 201 may be played back on the client system 200 in accordance with a user input, user-specified schedule or broadcast schedule. In some examples, the media library interface 220 may interface with a remote media source 80 in order to receive the media resource of a particular airing. When the media resource is selected for playback, an ancillary process is initiated by the client system 200 to retrieve metadata from the MDDS 100 and to display supplementary content with the playback of the media resource. In one implementation, MDDS interface 240 generates the request 44, which can identify the media resource of the selection 201. In examples such as described with FIG. 1, the request 44 can specify a media resource identifier 101, airing identifier 103 or other identifier that is correlative to the selection 201. As described with an example of FIG. 1, the MDDS 100 may match an identifier of the request 44 to a media record 99, in order to identify the metadata set 105 that is to be returned to the client system 200.

In one implementation, the media library interface 220 and/or media player 230 may receive playback data 233 from the content source 82. The media player 230 can receive the playback data 235, and then initiate playback of the media resource, so as to generate output content for user consumption (e.g., via the user interface 210).

In the ancillary process, the metadata manager 250 may process the metadata set 105 that is received from the MDDS 100 via the system interface 240. Among other functionality, the metadata manager 250 may buffer the metadata set 105, process the metadata set 105 to identify time-based metadata content that is to be provided with playback of the primary content, extract time slot identifiers 119 from the metadata set 105, and extract or retrieve tags 111. Additionally, the metadata manager 250 can use the tags 111 to retrieve supplemental content items 225 from one or more remote or independent network services. The retrieved supplemental content items 225 may be rendered during predetermined time slots of the primary content, as specified by time slot parameters 119 of the metadata set 105.

The metadata manager 250 may implement processes to retrieve and render the supplemental content items 225 in a manner that is synchronized to a predetermined timeline of the primary content. In some examples, the metadata manager 250 is integrated, or in communication with the media player 230 (i) to obtain or receive playback data 235 from the media player 230, and (ii) to transmit or otherwise provide the supplemental content data 237 to the media player 230. The playback data 235 can include individual frames that are used to render the primary content. As an addition or alternative, the playback data 235 can include information about the playback time of the primary content. Still further, the primary content can include metadata to identify events or aspects of the primary content during playback.

In some examples, the metadata manager 250 includes a synchronization component 252 and a content retrieval component 254. The synchronization component 252 may implement logic to synchronize the insertion of supplemental content data 237 by the media player 230, including overlays (e.g., images or video displayed concurrently with primary content) and sequential content (e.g., video such as commercials which temporarily replace the primary content).

In one implementation, the synchronization component 252 initiates a timer that is synchronized to a timeline of a primary content that is being (or will be) rendered through the media player 230. The synchronization component 252 may synchronize the timer to one or multiple synchronization markers 233 of the primary content. In some examples, the markers 233 are determined by the synchronization component 232 processing an output 239 of the media player 230. The output 239 may include, for example, an audio output, video output, or metadata generated from the media player 230. By way of example, the metadata generated can include a playback clock which the media player displays as runtime of a given playback. In variations, the media player 230 and/or the metadata manager 250 implements logic to process the output 239 for reference moments, which are known to map to a particular point in the timeline of the primary content. For example, the output 239 can correspond to the audio output of the primary content, and the synchronization component can include audio recognition logic to process the audio signal to detect a particular sequence (e.g., opening score, specific name or event that is descriptive of audio event or signature). Similarly, the output 239 can correspond to video from the primary content, and the synchronization component 252 can perform image recognition to identify a particular event, such as the frame for an opening credit. In this way, the synchronization component 252 can process the primary content to determine markers 233, which can reference the points of insertion for supplemental content data 237. The markers 233 determined from the output 239 may also determine when the metadata manager 250 implements operations for retrieving supplemental content for the media player 230 to render. In this way, the output 239 of the primary content can provide a synchronization reference or marker by which the supplemental content data 237 can be inserted into the primary content timeline in accordance with a desired time slot 119, and independent of delivery platform.

In some examples, the synchronization component 252 extracts one or more reference content markers from the metadata set 105. Each content marker may correspond to an image pattern and/or audio pattern for an event that occurs during the playback of the primary content (e.g., rendering of a hash in a corner of a frame, appearance of a character or object, occurrence of an audible, etc.), and each content marker can be paired with a reference moment in the timeline of the primary content, so as to a relative time during the playback of the primary content. The synchronization component 252 can implement content analysis logic to recognize or otherwise detect markers in the primary content. In some examples, the synchronization component 252 can detect markers to initiate a timer for a timeline during which supplemental content of one or multiple types may be rendered. In variations, the synchronization component 252 uses the markers to detect a window of time during which a supplemental content item is to be rendered.

As an alternative or variation, the markers 233 can be determined from external sources, such as scheduling data 141 (e.g., a broadcast schedule, see FIG. 1), provided by, for example, the broadcaster (or publisher or distributer) of the media resource that is being played back. For example, a publisher or distributor can publish a schedule that identifies a time when an airing is be transmitted, and the synchronization component 252 can synchronize the rendering of the supplemental content based on the reference time. As an addition or alternative, the reference time may identify "commercial breaks" such as instances when the primary content breaks to permit playback of a commercial, or when playback of the primary content is to resume after completion of a commercial break.

The content retrieval component 254 can implement processes to retrieve supplemental content data 225 from one or more remote sources 88. In some examples, the content retrieval component 254 retrieves supplemental content data 225 from remote sources 88, such as third-party advertisement networks. In some examples, the content retrieval component 254 may utilize one or more multiple connectors to advertisement networks in order to retrieve supplemental content data 225 for a particular airing. According to some examples, the retrieval component 254 retrieves the supplemental content data 225 using individual tags 111, which may be provided from the MDDS 100 as part of the ancillary process. In some examples, the tags 111 specify the remote source (e.g., the particular advertisement network) what is to be used in order to retrieve the supplemental content data 225.

In some variations, the content retrieval component 254 generates a request 255 for supplemental content, using the tags 111. The request 255 may include one or more criterion 211 for enabling the remote source 88 to select supplemental content data 225. The criterion 211 can correspond to, for example, any one or more of a keyword, classification or identifier, from which the remote source 88 can make selection of supplemental content data 225. In some examples, the criterion 211 can be provided by or determined from the metadata set 105. In variations, criterion can be determined from profile or contextual data stored on the playback device 40.

Figure 3:
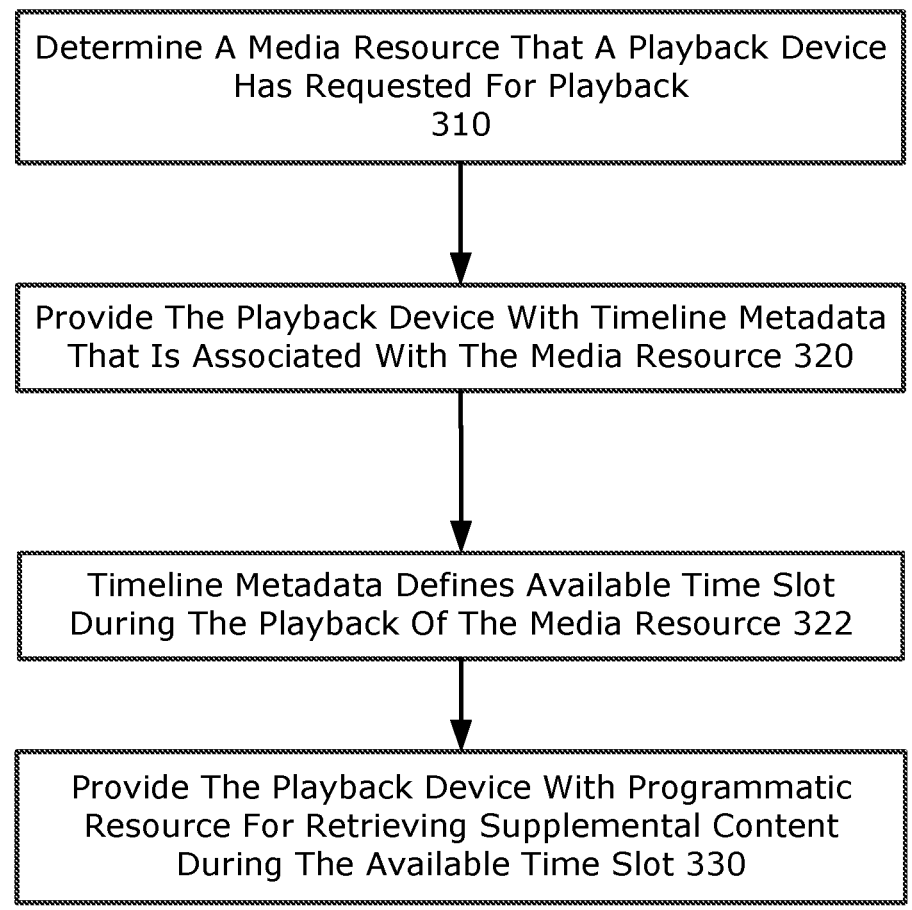
FIG. 3 illustrates an example method for providing time-based metadata to a playback device, in connection with the playback device playing back primary content.
Figure 4:
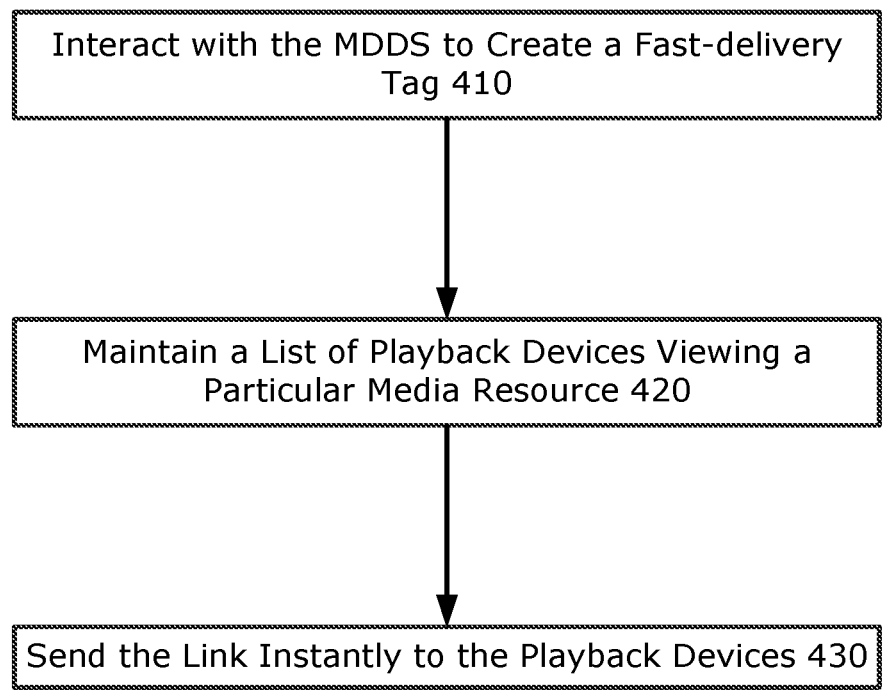
FIG. 4 illustrates an example method for selecting and providing supplemental content for live television in near-real time.

FIG. 3 provides an example method for providing time-based metadata to a playback device, in connection with the playback device playing back a primary content. FIG. 4 illustrates an example method for selecting and providing supplemental content for live television in near-real time. In describing examples of FIG. 3 and FIG. 4, reference may be made to elements of FIG. 1 or FIG. 2 for purpose of illustrating a suitable component or element for performing a step or sub-step being described.

With reference to an example of FIG. 3, the MDDS 100 determines a media resource that the playback device 40 has requested to playback (310). In some variations, the MDDS 100 may identify a media resource that is being played back on the playback device 40. In some examples, the MDDS 100 operates as a service, separate from a source of the media resource, from which primary content is rendered on the playback device 40. The playback device 40 may, for example, make a request 44 over the Internet to a service which implements the MDDS 100. The request 44 may include one or more identifiers for the media resource, such as, for example, a media resource identifier 103 and/or an airing identifier 101. The identifier(s) of the request can, for example, identify the particular work, the medium or device used to render the work (e.g., cable television or streaming network service) and/or context (e.g., broadcast or on-demand). The work may be episodic, so as to include, for example, each of a series identifier, a season identifier and an episode identifier.

In some examples, the MDDS 100 operates separately or independently from a source of the media resource, and the identifier(s) of the media resource are communicated to the MDDS 100 programmatically. For example, the playback device 40 can include logic to determine one or more applicable identifiers for an airing that is requested by a user. Alternatively, the playback device 40 can include logic to determine one or more applicable identifiers of the media resource based on a channel or media source selection of the user.

In response to receiving the request, the MDDS 100 can provide the playback device 40 with a set of time-based metadata that is associated with the media resource (320). As described with other examples, the set of time-based metadata may be correlative to a primary timeline of events in a playback of the media resource. In some examples, the MDDS 100 provides time-based metadata that includes timing parameters (or time slots) 119. The time slot parameters 119 may, for example, identify one or more available time slots (or durations of time), relative to a timeline of the primary content.

The MDDS 100 may provide the playback device 40 with one or more tags 111 that enable the playback device 40 to retrieve supplemental content from a remote source (330). In some examples, the playback device 40 receives time slot parameters 119 with the metadata set 105, and then uses the time slot parameters 119 to request the tags 111. In a variation, the MDDS 100 provides time slot identifiers 119 with the metadata set 105, and the playback device 40 uses the time slot identifiers 119 to request the tags 111.

In some examples, the MDDS 100 includes tag selection logic 120 to select tags 111 individually for a given request 44 of a playback device 40. The tag selection logic 120 may use, for example, profile information that is maintained or received from the playback device 40, as well as contextual information (e.g., location or IP address of the playback device) and information about the primary content to select tags 111. The tags may identify a remote source for supplemental content data 137. As an addition or variation, the tags 111 may specify terms and identifier for enabling selection of supplemental content for the user or playback device by the remote source. For example, the MDDS 100 may return individual tags 111 which are in the form of a link, structured to include keywords or terms as selected by logic of the MDDS 100.

With reference to an example of FIG. 4, an operator or programmatic entity interacts with the MDDS 100 to create a fast-delivery tag 111B (410) that can cause playback devices of a given population to instantly display a content item. The fast-delivery tag 111B may correspond to a data structure that includes or links to a content item. In one implementation, the data structure integrated a text or image item with a structure that can be pushed to individual media playback devices.

The MDDS 100 can maintain a list of playback devices which are viewing a particular media resource (e.g., live broadcast) (420). An operator may generate a fast link for the media resource using the tag creation tool 162.

Once the fast-delivery tag 111B is created, the delivery trigger 164 can send the link instantly to the playback devices (430). The tags 111B may be encoded to trigger the corresponding playback devices 40 to output the content associated with the tag 111B. In one implementation, the media playback devices 40 access the content item from a network location specified in the tag 111B. For example, the tag 111B can reference the network location corresponding to the operator website. In a variation, the tag 111B can link the playback component to a memory or network location provided by the MDDS 100, where the content item is stored. Still further, the 111B may integrate the content item with the data structure, so that the playback device 40 is triggered to render a supplemental content item using the tag 111B as the common transport vehicle.

Figure 5:
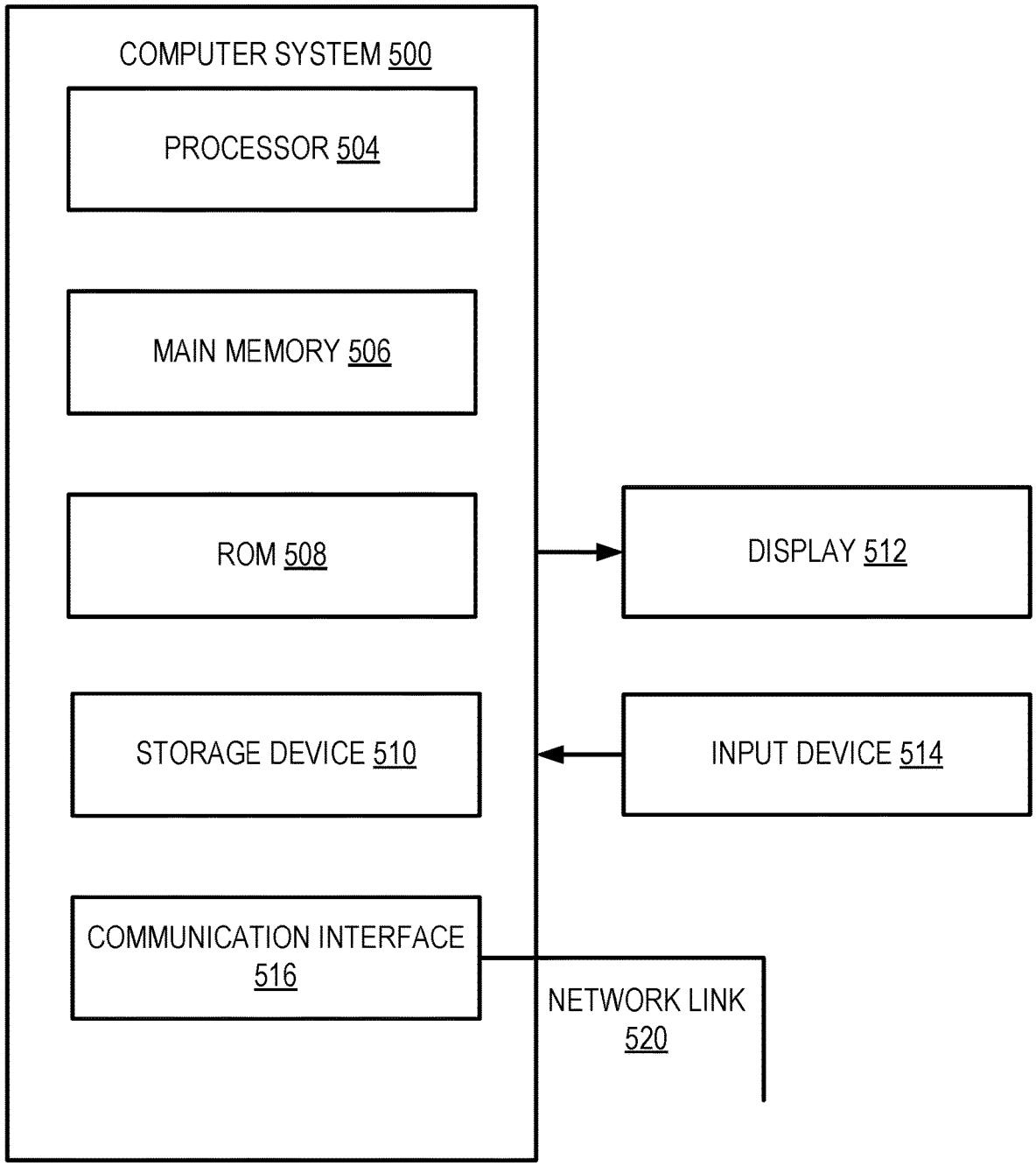
FIG. 5 is a block diagram that illustrates a computer system upon which embodiments described herein may be implemented.

FIG. 5 is a block diagram that illustrates a computer system upon which embodiments described herein may be implemented. For example, in the context of FIG. 1, MDDS 100, or portions thereof, may be implemented using a computer system such as described by FIG. 5. The MDDS may communicate with playback devices, paired devices and/or distribution sources of media content and/or associated metadata using a network such as the Internet.

In an embodiment, computer system 500 includes processor 504, main memory 506, ROM 508, storage device 510, and communication interface 516. Computer system 500 includes at least one processor 504 for processing information. Computer system 500 also includes a main memory 506, such as a random access memory (RAM) or other dynamic storage device, for storing information and instructions to be executed by processor 504. Main memory 506 also may be used for storing temporary variables or other intermediate information during execution of instructions to be executed by processor 504. Computer system 500 may also include a read only memory (ROM) 508 or other static storage device for storing static information and instructions for processor 504. A storage device 510, such as a magnetic disk or optical disk, is provided for storing information and instructions. The communication interface 516 may enable the computer system 500 to communicate with one or more networks through use of the network link 520.

Computer system 500 can include display 512, such as a cathode ray tube (CRT), a LCD monitor, and a television set, for displaying information to a user. An input device 514, including alphanumeric and other keys, is coupled to computer system 500 for communicating information and command selections to processor 504. Other non-limiting, illustrative examples of input device 514 include a mouse, a trackball, or cursor direction keys for communicating direction information and command selections to processor 504 and for controlling cursor movement on display 512. While only one input device 514 is depicted in FIG. 5, embodiments may include any number of input devices 514 coupled to computer system 500.

Embodiments described herein are related to the use of computer system 500 for implementing the techniques described herein. According to one embodiment, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement embodiments described herein. Thus, embodiments described are not limited to any specific combination of hardware circuitry and software.

FIG. 6 illustrates an example content selection system, according to one or more embodiments. A content selection system 600 such as described with an example of FIG. 6 may be implemented as a network service. In some examples, the content selection system 600 can be provided with or as part of MDDS 100. In variations, the content selection system 600 is provided as a separate network service from the MDDS 100.

With reference to an example of FIG. 6, the content selection system 600 includes inventory manager 610, advertiser interface 620, distribution logic 630 and tag distribution logic 640. The inventory manager 610 may maintain a data store of inventory 602. The inventory 602 may maintain records of available opportunities during which an advertiser can insert advertisement in connection with the rendering of an airing on playback devices in a given audience. In some implementations, the advertisement can be supplementary content that is of a form that renders concurrently with the primary content.

In context of MDDS 100, an inventory 602 can be generated and/or integrated with the metadata store 116. In some implementations, an aggregation component 604 can extract relevant information from the metadata store 116 for specific airings (or for the respective record 99) in order to determine inventory attributes for individual airings. By way of example, the inventory attributes can include time slot identifiers 601, airing identifiers 603, category (or classification) tags 605, and/or keywords 607. The inventory attributes can be determined from, for example, a content publisher, content creator or other party that has rights to control the rendering of supplemental content in connection with the particular airing. Some inventory attributes, such as category tags 605 or keywords 607, can be based on content-based characteristics of the airing, such as a theme, ambience, or event. The content attributes can be determined programmatically, or provided by manual input. For example, a theme or ambience of the hearing can be identified by performing an analysis of (i) the musical soundtrack accompanying the airing, (ii) the lighting of the scene accompany the airing, and/or (iii) other audiovisual signatures of a theme, setting or ambience of the primary content.

In some examples, the time slot identifiers 601 and/or airings 603 can be associated with whitelist or blacklists 611A, 611B. The respective lists can identify supplemental content items by a type, genre, or source (e.g., retailer manufacturer, Brand, etc.), to permit (whitelist) or deny (blacklist) in connection with the rendering of a corresponding primary content. For example, if the time slot identifier 601 pertains to a portion of an airing depicting a placed brand product in a scene of a storyline, the blacklist associated with the time slot identifier may exclude competing products to that of things to be the placed brand. Likewise, if a theme of the particular portion of the airing is for a desired demographic of viewers, the blacklist associated with the time slots of the particular airing may exclude advertisements that are by type, genre or source, deemed to be offensive and/or ineffectual to that desired demographic. The use of the time slot identifiers 601 allows the content distributor or publisher to specify, for example, a preference or designation for certain types of supplemental content (e.g., by theme, source, brand, etc.), as well as preference or designations against certain types of supplemental content. The preference or designation for or against certain types of supplemental content can be made specific to specific slices of the primary content.

The inventory manager 610 may include an inventory estimator 612 to determine how much inventory is available for particular airing. The inventory estimator 612 may be based on the number of time slots which the particular airing can carry. Each time slot identifier 601 can represent an inventory that corresponds to the number of viewings the corresponding portion of primary content is expected to receive. Additionally, each airing may have a set number of time slot identifiers 601, which collectively represent the inventory for the airing. For example, a 20 minute program may carry four time slots which are spaced five minutes apart, while a one hour program may double the number of time slots. The inventory estimator 612 may also determine and correlate inventory to profile characteristics of the playback devices 40 (e.g., computing platform of playback device 40, transmission medium in which the airing is received by respective playback devices 40, etc.). In particular, the available inventory determination can segment the available inventory to profile characteristics of the viewing population (e.g., age and gender of viewer). Therefore, the availability estimator 612 can estimate inventory for (i) individual time slots of an airing, (ii) collectively for all time slots of an airing, and (iii) further with respect to particular segments of the viewing population.

The inventory valuation 614 can implement an algorithm, logic or component to determine a valuation 615 of a particular time slot. In some examples, a bidding process may be used to determine the valuation 615. In some variations, the valuation 615 can be made specific to profile characteristics of the viewing audience. For example, popular shows may have higher valuation for use of the respective time slots, but smaller or less desirable demographics for the particular popular program can also be made subject of inventory and offered for less.

The inventory manager 610 may generate inventory information 613 for the advertiser interface. The inventory information 613 may include, for example, quantitative representations of available inventory for specific time slots of different airings. Additionally, the inventory information 613 may include the valuations 615 of the time slots for the respective airings. The advertiser interface 620 may receive advertiser requests 611, and match criteria specified in the respective advertiser requests to inventory information 613. Thus, the inventory information 613 can include data sets associated with the time slot identifiers 601.

In some implementations, the advertiser interface 620 includes matching logic 622 that matches advertiser criteria, specified with advertiser requests 621, to time slots 601. The matching may be based on, for example, attributes of categories and/or keywords. In matching advertiser requests, the matching logic 622 may also determine whether the valuation 615, as determined for specific time slots 601, conforms to valuation parameters specified by the advertiser requests. The matching logic 622 may also implement matching rules 623, which can include implementation rules or weights to implement one or both of the whitelists 611A and/or blacklists 611B.

When the advertiser requests 621 are matched to time slot identifiers 601, an advertiser data set 625 can be linked to the time slot identifier. The advertiser data set 625 can include, for example, a network location (e.g., URL) where a supplemental content item is provided. In variations, the advertiser data set 625 includes a content element (e.g., image). In other variations the advertiser data set 625 identifies an advertisement service and an identifier or criteria to enable programmatic identification of a content item provided by the advertiser.

According to some examples, the advertiser interface 620 communicates the advertiser data set 625 to the MDDS 100, and distribution data 627 to the distribution logic 630. The distribution data 627 may, for example, specify a parameter that determines a quantity or frequency of the number of instances in which the supplemental content of the advertiser data set 625 is to be rendered with the matched portion of an airing corresponding to a particular time slot identifier 601. In some variations, the advertiser's requests can specify a campaign and campaign value (how much an advertiser will pay for the particular campaign). The distribution data 627 may also specify profile parameters that are specific to the matched advertiser request 621. For example, the distribution data may specify a weight or quantity for each gender.

In some examples, the advertiser data set 625 can be communicated to a tag population logic 630, and the tag population logic 630 can populate a tag element 641 or structure with the advertiser data set 625. The tag element 641 can be assimilated, or otherwise structured into tags 111 which the MDDS 100 communicates to playback devices 40. In this way, the tag population logic 630 enables the MDDS 100 to communicate, as the response 54 to a requesting playback device 40, individual tags 111 which include identifiers for enabling the playback device to retrieve or receive a specific supplemental content item when the primary content is being viewed.

In some implementations, the tag elements 641 include identifiers that can identify corresponding supplemental content items by network location (e.g., URL or network address). In variations, the tag elements 641 include identifiers that can identify a third-party advertiser (e.g., ad network), as well as a campaign or content identifier as provided by the advertiser network. Still further, the tag elements 641 can include a content element, such as a word or wording that can be displayed as the supplemental content. The tag element 641 can also provide data that identifies one or more profile parameters for which the tag or tag selection is to be provided. In some variations, the tag element 641 can be assimilated into tags 111 that carry one or more distribution parameters (e.g., weights, frequency in which a tag is to select a particular campaign or supplemental content item), and the distribution parameters can be made specific to a particular profile parameter or set of profile parameters.

The distribution logic 640 can determine weights 629 for implementing each campaign. The weights 629 can be communicated to the tag selection logic 120 via the interface 650, and the tag selection logic 120 may use the weights to select tags (or tag elements) to communicate in responses 54 to requesting playback devices 40. In some variations, the weights 629 are specific to profile parameters of playback devices 40, where the profile parameters may be determined by profile information 109 of individual devices. The weights 629 may determine a proportionate count in the number of times which the supplemental content for a given advertiser is rendered relative to a total number of viewing devices. As an alternative or variation, the weights 629 may identify a frequency in which the supplemental content of a particular advertiser is displayed to individual playback devices 40 through use of metadata provided by the MSSD 100.

In some implementations, the weights can be stored as part of the tag or tag elements in the tag store 135. The tag selection logic 120 can select tags based on the recorded and stored weights. In variations, the tag selection logic 120 receives and uses the weights 629.

In some examples, the advertisement system 600 can include an interface 650 to interface with MDDS 100. Thus, for example, the tag store 135 can be programmatically updated and maintained in accordance with campaigns which are purchased and managed through the advertisement system 600.

Figure 7:
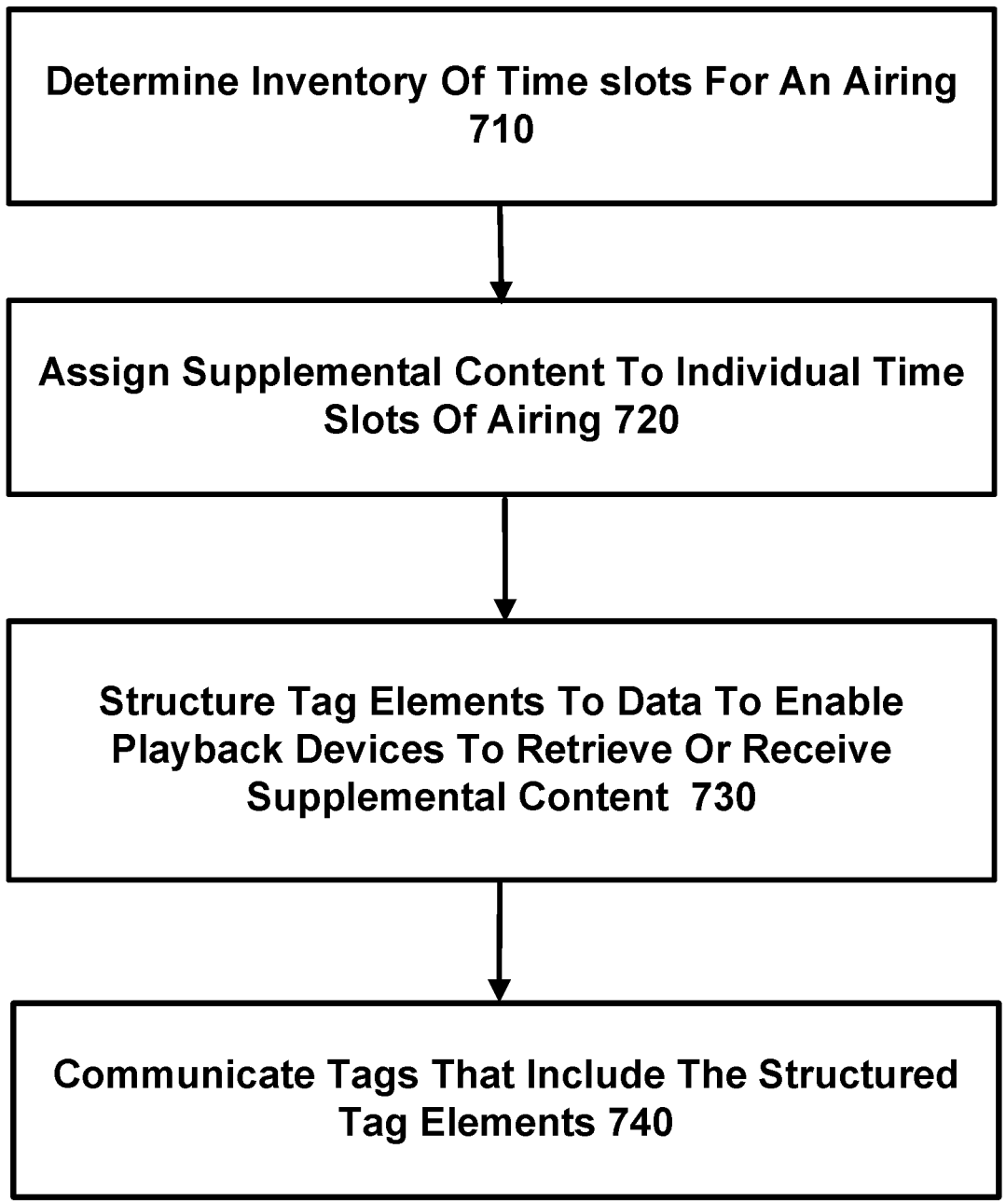
FIG. 7 illustrates an example method for providing supplemental content with airings of programming media.

FIG. 7 illustrates an example method for providing supplemental content with airings of programming media. An example method such as described with FIG. 7 may be implemented using an example system such as described with FIG. 6 and FIG. 1. In some examples, content selection system 600 operates to identify supplemental content items, and a metadata delivery platform operates to generate and transmit tags to select playback devices of a population of playback devices. Accordingly, reference may be made to elements of FIG. 1 and/or FIG. 6 for purpose of illustrating functionality for performing a step or sub-step being described.

With reference to FIG. 7, a determination is made as to an inventory of time slots for a given airing (710). In some examples, the media record 99 for the airing may identify one or more multiple time slots during which supplemental content items may be concurrently rendered on media playback devices along with the primary content of the airing. The supplemental content items can include images, text images and/or video. In some examples, the supplemental content items can be interactive to detect selection input or other interaction from playback devices that receive user input during the rendering of the respective airing.

The inventory can include quantitative aspects which include a number of time slots that define segments of an airing. In some variations, the quantitative aspects include an expected number of playback devices that may receive a supplemental content item for each of the defined time slots of the airing. Still further, in some variations, the number of playback devices may be further categorized in accordance with profile parameters which may be associated or determine to be relevant for individual playback devices.

The content selection system 600 may operate to assign a supplemental content item of a third-party to a time slot of the given airing when the given airing is rendered by individual playback devices in a group of playback devices (720). According to some variations, the assignment of supplemental content is specific to selection parameters that include one or more of profile characteristics of playback devices that render the primary content. By way of example, the profile characteristics include one or more of a geographic region where the playback device is likely located, a computing platform of individual playback devices, and/or a transmission medium of individual playback devices to receive and render the media resource of the airing. In some variations, the profile characteristics include characteristics of users of individual playback devices (e.g., gender, age and/or viewing preferences).

In some variations, the content selection system 600 determines a weight or priority value that can control the number of times and/or frequency in which a particular supplemental content item is to be rendered in connection with an airing. In variations, the tag selection logic 120 associates a weight or priority value with profile selection parameter, corresponding to profile attributes of playback devices and/or user profiles.

The content selection system 600 may structure tag elements to incorporate data for enabling individual playback devices 40 to retrieve or otherwise receive the assigned supplemental content item during the corresponding predefined time slot (730). In some examples, tag population logic 640 structures a tag element to include an identifier and/or content element for a selected supplemental content item. The identifiers of respective supplemental content items may each correspond to one of (i) a network location of an advertiser or advertiser network, or (ii) an identifier to enable a third-party advertiser network to identify the particular supplemental content items.

The MDDS 100 or content selection system 600 may operate to communicate tags 111 that include the structured tag element to each of multiple client devices that are used to view the corresponding airing (740). As described with other examples, the playback devices that receive the tags 111 are triggered to access remote sources where the supplemental content item is provided. For example, the playback devices 40 may be triggered to access third-party advertiser networks, or network locations where supplemental content items are stored.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method comprising:
   receiving a request associated with an output device, wherein the request indicates content;

sending, to the output device, a set of time-based metadata associated with a timeline of events in the content, wherein a start time associated with output of the content facilitates synchronization of the set of time-based metadata with the timeline of events in the content, and wherein the set of time-based metadata indicates an available time slot during the output of the content; and sending, to the output device, an indication of a content resource that facilitates access to supplemental content for output at the available time slot, wherein the supplemental content is selected based on campaign data indicating one or more timing parameters for outputting the supplemental content.

2. The method of claim 1, wherein receiving the request for the content comprises determining the content based on an identifier, wherein the identifier is embedded within the content or received from a source of the content.

3. The method of claim 2, wherein the identifier embedded within the content corresponds to a channel identifier, and wherein determining the content comprises determining a broadcast schedule for a channel associated with the channel identifier.

4. The method of claim 1, wherein receiving the request for the content comprises:
recognizing content of the content, and
determining an identifier of the content based on a fingerprint of the recognized content.

5. The method of claim 1, wherein receiving the request for the content comprises determining a media identifier of a content asset and an airing of the content asset on a distribution medium.

6. The method of claim 1, wherein the set of time-based metadata comprises a start time of the available time slot, an end time of the available time slot, and a duration of the available time slot.

7. The method of claim 1, further comprising causing the output device to:
send a request for one or more tags that are specific to the available time slot;
access a remote source to request the supplemental content using the one or more tags; and
output, during the available time slot, at least a portion of the supplemental content.

8. The method of claim 7, wherein causing the output device to output the supplemental content comprises causing the output device to output the supplemental content as an overlay.

9. The method of claim 1, wherein sending the indication of the content resource comprises sending, to the output device, an indication to retrieve at least one supplemental content item from a remote source.

10. The method of claim 1, wherein the supplemental content is further based on a profile associated with a user of the output device.

11. The method of claim 10, further comprising causing the output device to communicate the profile associated with the user of the output device to a network service configured to select the supplemental content.

12. The method of claim 11, further comprising selecting, based on data from the network service, the indication, and sending the indication to the output device to cause the output device to access an advertisement from an advertisement service associated with an advertiser.

13. The method of claim 10, wherein the profile is based at least in part on at least one of:

content that the user previously viewed or content that has previously been viewed on the output device,
prior supplemental content that the user previously interacted with on a prior viewing of prior content, or
a type of the output device.

14. The method of claim 10, wherein the profile is based at least in part on demographic information associated with the user of the output device.

15. The method of claim 1, wherein the supplemental content comprises an advertisement or interactive supplemental content.

16. The method of claim 1, further comprising sending the content to the output device for output,
wherein sending the indication of the content resource that facilitates access to the supplemental content comprises sending, based on sending the content to the output device, the indication of the content resource that facilitates access to the supplemental content.

17. The method of claim 1, wherein the campaign data comprises at least one of:
data from an advertiser associated with the supplemental content,
data from an advertising service,
data associated with an advertiser request, or
data configured by an advertiser.

18. The method of claim 1, wherein the one or more timing parameters indicates a quantity or frequency.

19. A method comprising:
receiving a request associated with an output device, wherein the request indicates content;
sending, to the output device, metadata comprising a timeline of events in the content and an indication of an available time slot during output of the content, wherein a start time associated with the output of the content facilitates synchronization of the metadata with the timeline of events in the content; and
sending, to the output device, an indication of a content resource that facilitates access to supplemental content for output at the available time slot, wherein the supplemental content is selected based on campaign data indicating one or more timing parameters for outputting the supplemental content.

20. The method of claim 19, wherein receiving the request indicating the content comprises determining the content based on an identifier associated with the content.

21. The method of claim 20, wherein the identifier comprises a channel identifier, and wherein determining the content comprises determining the content based on a broadcast schedule associated with the channel identifier.

22. The method of claim 19, wherein receiving the request indicating the content comprises determining a correspondence of the content to a fingerprint characteristic.

23. The method of claim 19, wherein the metadata comprises a start time of the available time slot, an end time of the available time slot, and a duration of the available time slot.

24. The method of claim 19 wherein the content resource causes the output device to:
send a request for one or more tags that are specific to the available time slot;
send, to a remote source, a request for the supplemental content using the one or more tags; and
output, during the available time slot, at least a portion of the supplemental content.

25. The method of claim 19, wherein the supplemental content is further based on a profile associated with a user of the output device.

26. The method of claim 19, wherein the campaign data comprises at least one of:
   data from an advertiser associated with the supplemental content,
   data from an advertising service,
   data associated with an advertiser request, or
   data configured by an advertiser.

27. The method of claim 19, wherein the one or more timing parameters indicates a quantity or frequency.

28. A device comprising:
   one or more processors; and
   memory storing instructions that, when executed by the one or more processors, cause the device to:
      receive a request associated with an output device, wherein the request indicates content;
      send, to the output device, metadata comprising a timeline of events in the content and an indication of an available time slot during output of the content, wherein a start time associated with the output of the content facilitates synchronization of the metadata with the timeline of events in the content; and
      send, to the output device, an indication of a content resource that facilitates access to supplemental content for output at the available time slot, wherein the supplemental content is selected based on campaign data indicating one or more timing parameters for outputting the supplemental content.

29. The device of claim 28, wherein the metadata comprises a start time of the available time slot, an end time of the available time slot, and a duration of the available time slot.

30. The device of claim 28, wherein the content resource causes the output device to:
   send a request for one or more tags that are specific to the available time slot;
   send, to a remote source, a request for the supplemental content using the one or more tags; and
   output, during the available time slot, at least a portion of the supplemental content.

31. The device of claim 28, wherein the instructions that, when executed by the one or more processors, cause the device to receive the request for the content comprise instructions that, when executed by the one or more processors, cause the device to determine a correspondence of the content to a fingerprint characteristic.

32. The device of claim 28, wherein the supplemental content is further based on a profile associated with a user of the output device.

33. The device of claim 28, wherein the campaign data comprises at least one of:
   data received from an advertiser associated with the supplemental content,
   data from an advertising service,
   data associated with an advertiser request, or
   data configured by an advertiser.

34. The device of claim 28, wherein the one or more timing parameters indicates a quantity or frequency.

* * * * *